United States Patent
Kwon et al.

(10) Patent No.: US 11,609,483 B2
(45) Date of Patent: Mar. 21, 2023

(54) INTEGRATED CIRCUITS INCLUDING CHARGING CIRCUIT AND FLASH DRIVER, METHODS OF OPERATING THE INTEGRATED CIRCUITS, AND ELECTRONIC DEVICES INCLUDING THE INTEGRATED CIRCUITS

(71) Applicant: Samsung Electronics Co., Ltd., Suwon-si (KR)

(72) Inventors: Min-kyu Kwon, Hwaseong-si (KR); Chang-geun Lee, Yongin-si (KR); Dong-joon Kim, Seoul (KR); Sang-uk Cho, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 368 days.

(21) Appl. No.: 16/744,463

(22) Filed: Jan. 16, 2020

(65) Prior Publication Data
US 2020/0241390 A1   Jul. 30, 2020

(30) Foreign Application Priority Data
Jan. 25, 2019   (KR) .................. 10-2019-0010068

(51) Int. Cl.
*H02J 7/00* (2006.01)
*G03B 15/05* (2021.01)

(52) U.S. Cl.
CPC ............ *G03B 15/05* (2013.01); *H02J 7/0024* (2013.01); *H02J 7/0068* (2013.01); *H02J 7/007182* (2020.01)

(58) Field of Classification Search
None
See application file for complete search history.

(56) References Cited

U.S. PATENT DOCUMENTS

| | | | |
|---|---|---|---|
| 7,772,720 B2 | 8/2010 | McGee et al. | |
| 8,044,610 B2 | 10/2011 | Sandner et al. | |
| 9,555,715 B2 | 1/2017 | Sugano | |
| 10,298,028 B1 * | 5/2019 | Venkatasamy | H02J 7/0013 |
| 10,444,815 B1 * | 10/2019 | Sultenfuss | G06F 1/3296 |
| 2008/0162770 A1 * | 7/2008 | Titiano | G06F 1/3203 |
| | | | 710/309 |

(Continued)

FOREIGN PATENT DOCUMENTS

KR   10-2018-0005853 A   1/2018

*Primary Examiner* — Arun C Williams
(74) *Attorney, Agent, or Firm* — Harness, Dickey & Pierce, P.L.C.

(57) ABSTRACT

An integrated circuit (IC) includes circuitry configured to, drive a flash unit comprising at least one light-emitting device, by providing a supply voltage to the flash unit based on an external input power source or a battery, the supply voltage being provided along one of a plurality of different current paths corresponding to a plurality of operation states, no voltage being received from the external input power source in a first operation state among the plurality of operation states, a first voltage level being received from the external input power source in a second operation state among the plurality of operation states, and a second voltage level being received from the external input power source in a third operation state among the plurality of operation states, and charge the battery based on an charging voltage received from the external input power source.

20 Claims, 18 Drawing Sheets

(56) References Cited

U.S. PATENT DOCUMENTS

| | | | |
|---|---|---|---|
| 2009/0085502 A1* | 4/2009 | Geris | G03B 15/05 |
| | | | 315/308 |
| 2015/0077014 A1 | 3/2015 | Ng et al. | |
| 2015/0107316 A1* | 4/2015 | Kirkjan | G07C 9/00309 |
| | | | 70/275 |
| 2015/0137735 A1 | 5/2015 | Wacholtz, Jr. | |
| 2016/0046199 A1 | 2/2016 | Butler et al. | |
| 2017/0313200 A1 | 11/2017 | Kung | |

* cited by examiner

INTEGRATED CIRCUITS INCLUDING CHARGING CIRCUIT AND FLASH DRIVER, METHODS OF OPERATING THE INTEGRATED CIRCUITS, AND ELECTRONIC DEVICES INCLUDING THE INTEGRATED CIRCUITS

CROSS-REFERENCE TO RELATED APPLICATION

This application claims the benefit of Korean Patent Application No. 10-2019-0010068, filed on Jan. 25, 2019, in the Korean Intellectual Property Office, the disclosure of which is incorporated herein in its entirety by reference.

BACKGROUND

The inventive concepts relate to an integrated circuit (IC), and more particularly, to ICs including a charging circuit and a flash driver, methods of operating the ICs, and/or electronic devices including the ICs.

With the development of electronic technology, various kinds of electronic devices are in use. A mobile electronic device may be driven using a battery included therein. As power consumption of electronic devices increases, use of higher capacity batteries also increases. Batteries may be charged at various speeds according to the magnitude of a voltage supplied by a charger, that is, according to a fast charging method or a normal charging method.

An electronic device may include a flash unit configured to capture images of a subject at a user's request. Since the flash unit irradiates strong light, a consumed voltage of the flash unit may be greater than that of each of other internal components of the electronic device. An internal voltage of a flash driver configured to drive the flash unit may be relatively high, and thus, power control is an important consideration.

SUMMARY

The inventive concepts provide an integrated circuit (IC) in which a charging circuit is integrated with a flash driver and which includes a plurality of current paths configured to drive the flash driver.

According to an aspect of the inventive concepts, there is provided an IC including circuitry configured to, drive a flash unit comprising at least one light-emitting device, by providing a supply voltage to the flash unit based on an external input power source or a battery, the supply voltage being provided along one of a plurality of different current paths corresponding to a plurality of operation states, no voltage being received from the external input power source in a first operation state among the plurality of operation states, a first voltage level being received from the external input power source in a second operation state among the plurality of operation states, and a second voltage level being received from the external input power source in a third operation state among the plurality of operation states, and charge the battery based on an charging voltage received from the external input power source.

According to another aspect of the inventive concepts, there is provided a method of operating an IC configured to drive a flash unit. The method includes first driving the flash unit based on a charging voltage and a charging current received from at least one external input power source or a battery voltage and a battery current received from a battery when a first bypass voltage sensing signal is logic low, the first bypass voltage sensing signal indicating a bypass voltage of a bypass node; and second driving the flash unit based on the battery voltage and the battery current received from the battery when the first bypass voltage sensing signal is logic high.

According to another aspect of the inventive concepts, there is provided an electronic device including a camera unit, a flash unit configured to irradiate flash light to a subject, a main power-management IC (PMIC) chip connected to a system node and configured to provide a supply voltage to one or more internal components of the electronic device, and circuitry comprising a light-emitting device switch and a system switch, the circuitry being configured to, drive the flash unit based on a charging voltage received from an external input power source or a battery voltage received from a battery, and charge the battery based on the charging voltage, the light-emitting device switch being configured to control driving of the flash unit, the system switch being between the system node and the light-emitting device switch, the system switch being configured to apply the battery voltage received from the battery to the flash unit through the system node.

According to another aspect of the inventive concepts, there is provided an IC into which a charging circuit and a flash driver are integrated, thereby reducing the cost of an electronic device. The IC differently controls a current path configured to drive the flash driver when the electronic device is in each of a high-speed charging mode in which, for example, a voltage applied to the charging circuit is a relatively high voltage, a normal charging mode in which, for example, a voltage is lower than in the high-speed charging mode, and a battery drive mode. Thus, the IC may stably drive a camera flash in each of the different modes.

BRIEF DESCRIPTION OF THE DRAWINGS

Embodiments of the inventive concepts will be more clearly understood from the following detailed description taken in conjunction with the accompanying drawings in which.

DETAILED DESCRIPTION

Embodiments will now be described more fully with reference to the accompanying drawings in which some embodiments are shown.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, or in some cases be performed in reverse order. Also, functions or operations illustrated as being performed as multiple functions or operations may be performed as a single function or operations, and functions or operations illustrated as being performed as a single function or operation may be performed as multiple functions or operations.

Figure 1:
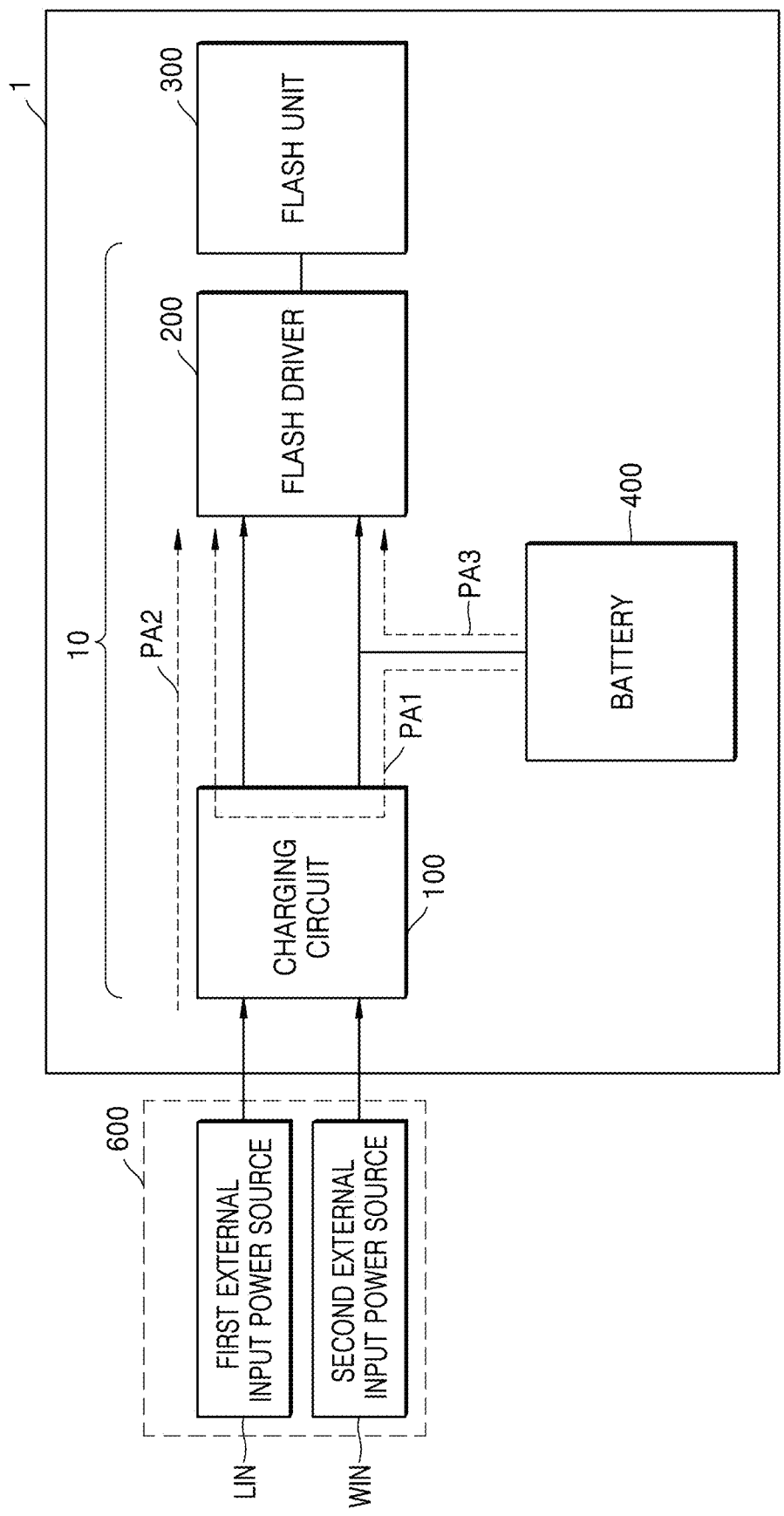
FIG. 1 is a block diagram of an electronic device according to an embodiment.

FIG. 1 is a block diagram of an electronic device 1 according to an embodiment.

Referring to FIG. 1, the electronic device 1 may include an integrated circuit (IC) 10, a flash unit 300, and/or a battery 400, The IC 10 may include a charging circuit 100 and/or a flash driver 200. The electronic device 1 may receive a voltage and/or current from at least one of the battery 400 and/or at least one external input power source 600 (also referred to herein as "the external input power source 600"). The external input power source 600 may include at least one of a first external input power source LIN and/or a second external input power source WIN. The IC 10 may drive the flash driver 200 based on the received voltage and current through a plurality of current paths (e.g., PA1, PA2, and/or PA3).

Referring to FIG. 1, the electronic device 1 may be in a first operation state (e.g., a battery drive mode) in which a voltage is not applied by the external input power source 600 and the electronic device 1 operates at a voltage applied by the battery 400, a second operation state (e.g., a normal charging mode) in which an input voltage having a first voltage level is applied by the external input power source 600, and a third operation state (e.g., a fast charging mode) in which an input voltage having a second voltage level higher than the first voltage level is applied by the external input power source 600. In the first operation state, the second operation state, and/or the third operation state, the electronic device 1 may drive the flash driver 200 based on a path appropriate for each operation state, from among different current paths (e.g., PA1, PA2, and/or PA3).

Hereinafter, in the first operation state, the external input power source 600 (e.g., charger) may not be connected to the electronic device 1 so that the battery 400 may not be charged (e.g., receiving power from the external input power source 600). In this case, the charging circuit 100 may boost the voltage applied by the battery 400 and provide the boosted voltage to various internal components of the electronic device 1. For example, in the first operation state, the charging circuit 100 may output the boosted voltage to the flash driver 200. In some example embodiments, the charging circuit 100 may output a voltage to the external input power source 600 inversely (e.g., such that the charger receives power from the electronic device 1). Furthermore, the first operation state may include a state in which the flash driver 200 is to be protected because a voltage applied by the external input power source 600 has an excessively high voltage level. According to some example embodiments, the first operation state may be a state in which a first on-the-go (OTG) voltage is received from the external input power source 600. The OTG voltage may refer to a voltage applied when the external input power source 600 provides data using an OTG method.

Hereinafter, in the second operation state, the electronic device 1 may charge the battery 400 with a voltage having the first voltage level lower than a voltage level of a voltage in the third operation state that will be described below. For example, in the second operation state, the electronic device 1 may receive a voltage of about 5V from the first input power source LIN or the second input power source WIN and charge the battery 400 (e.g., using a first charging voltage and/or first charging current). However, the first voltage level is not limited to the above-described voltage level and may be a level of a typical charging voltage commonly used in various electronic devices. Also, the second operation state may be a state in which a voltage level of a voltage output by the external input power source 600 satisfies an operating condition of the flash driver 200.

Hereinafter, in the third operation state, the electronic device 1 may charge the battery 400 with a voltage having the second voltage level (e.g., using a second charging voltage and/or second charging current). For example, in the third operation state, the electronic device 1 may receive a voltage of about 9V from the first input power source LIN or the second input power source WIN and charge the battery 400. However, the second voltage level is not limited to the above-described voltage level and may be a level of a fast charging voltage commonly used in various electronic devices. Also, the third operation state may be a state in which the external input power source 600 receives a second OTG voltage higher than a voltage level of the first OTG voltage. According to some example embodiments, the third operation state may be a state in which, although the external input power source 600 outputs the input voltage having the first voltage level, the charging circuit 100 performs an initial voltage regulation (IVR) operation to protect the external input power source 600. Here, the IVR operation may be an operation of reducing a difference in voltage between the external input power source 600, which has a small capacity or is broken, and the charging circuit 100 and reducing the burden of the external input power source 600.

According to an embodiment, in the first operation state, the IC 10 may form a first current path PA1 to drive the flash unit 300. For example, the IC 10 may output a voltage and current of the battery 400 (e.g., a battery voltage and/or battery current) to the flash driver 200 through the first current path PA1, which is formed from the battery 400 through the charging circuit 100 to the flash driver 200. Accordingly, the flash unit 300 may be driven based on the voltage and the current, which are output by the battery 400 through the first current path PA1.

According to some example embodiments, in the second operation state, the IC 10 may form a second current path PA2 to drive the flash unit 300. For example, the IC 10 may output a voltage and current, which are output by the external input power source 600 (e.g., a first charging voltage and/or first charging current), to the flash driver 200 through the second current path PA2, which may be formed from the external input power source 600 through the charging circuit 100 to the flash driver 200. Accordingly, the flash unit 300 may be driven based on the voltage and the current, which are output by the external input power source 600 through the second current path PA2.

According to some example embodiments, in the third operation state, the IC 10 may form a third current path PA3 to drive the flash unit 300. For example, the IC 10 may output the voltage and the current, which are output by the battery 400 (e.g., a battery voltage and/or battery current), to the flash driver 200 through the third current path PA3, which is formed from the battery 400 to the flash driver 200. In the third operation state, an input voltage having a relatively high level may be applied by the external input power source 600 to the electronic device 1 (e.g., a second charging voltage and/or second charging current) to charge the electronic device 1 (e.g., the battery 400) at high speed.

In conventional integrated circuits and/or electronic devices, the external input power source 600 may apply a voltage higher than a breakdown voltage of elements included in the flash driver 200, and the flash driver 200 may be damaged. However, according to some example embodiments, in the third operation state, the IC 10 may apply a voltage of the battery 400, which has a relatively low level, to the flash driver 200 through the third current path PA3, thereby overcoming the deficiencies of the conventional electronic devices and eliminating and/or reducing occurrence of flash driver damage caused by high input voltage.

According to an example embodiment, the first external input power source LIN and the second external input power source WIN may each include a wired input power source and/or a wireless input power source. In an example, the wired input power source may supply power through a travel adapter to the electronic device 1 by wire. In an example, the wireless input power source may supply power through a wireless power transmitter to the electronic device 1. For example, methods of supplying power wirelessly may include a magnetic induction method, a magnetic resonance method, and/or an electromagnetic wave method. In some example embodiments, the external input power source 600 may transmit data. For example, the external input power source 600 may transmit data to the electronic device 1 using an OTG method. In this case, when the electronic device 1 receives data from the external input power source 600, the electronic device 1 may enter an OTG mode as described below.

The flash driver 200 may control overall operations of the flash unit 300. For example, the flash unit 300 may include a plurality of light-emitting diodes (LEDs), and the flash driver 200 may include switches (e.g., 230 of FIG. 2), which are respectively connected to the plurality of LEDs. The flash driver 200 may control the switches to control operations of the plurality of LEDs. Furthermore, the flash driver 200 may further include switches (e.g., 210 and 220 of FIG. 2) connected to the charging circuit 100 to output a voltage to the flash unit 300, and/or include switches connected to various internal components of the electronic device 1.

In conventional integrated circuits and/or electronic devices, there has been no solution for controlling both a charging circuit configured to support fast charging and a flash driver in a single integrated circuit due to the flash driver damage issues discussed above. Accordingly, the conventional integrated circuits and/or electronics devices incorporate separate IC chips for the charging circuit and flash driver resulting in an excessively high bill of materials (BOM) (e.g., physical chip size). However, according to an example embodiment, a single IC 10 including both the flash driver 200 and the charging circuit 100 configured to support fast charging may be provided eliminating and/or reducing occurrence of flash driver damage caused by high input voltage as discussed above. Accordingly, a bill of materials (BOM) (e.g., physical IC chip size) may be reduced, and the flash unit 300 may be efficiently used in accordance with various power supply situations for the electronic device 1.

In addition, a voltage having a high voltage level may be applied by the external input power source 600 to the electronic device 1 to charge the electronic device 1 (e.g., the battery 400) at high speed. In this case, elements included in an electronic device of conventional integrated circuits may be implemented as high-voltage elements to increase sizes of chips included in the electronic devices. However, according to an example embodiment, the IC 10 may apply a voltage output by the battery 400 to the flash driver 200 and/or the flash unit 300 through the third current path PA3 instead of the voltage output by the external input power source 600. Thus, since high-voltage elements may not be used for the IC 10, the size of the IC 10 may be reduced, and/or the size of the electronic device 1 may also be reduced.

Figure 2:
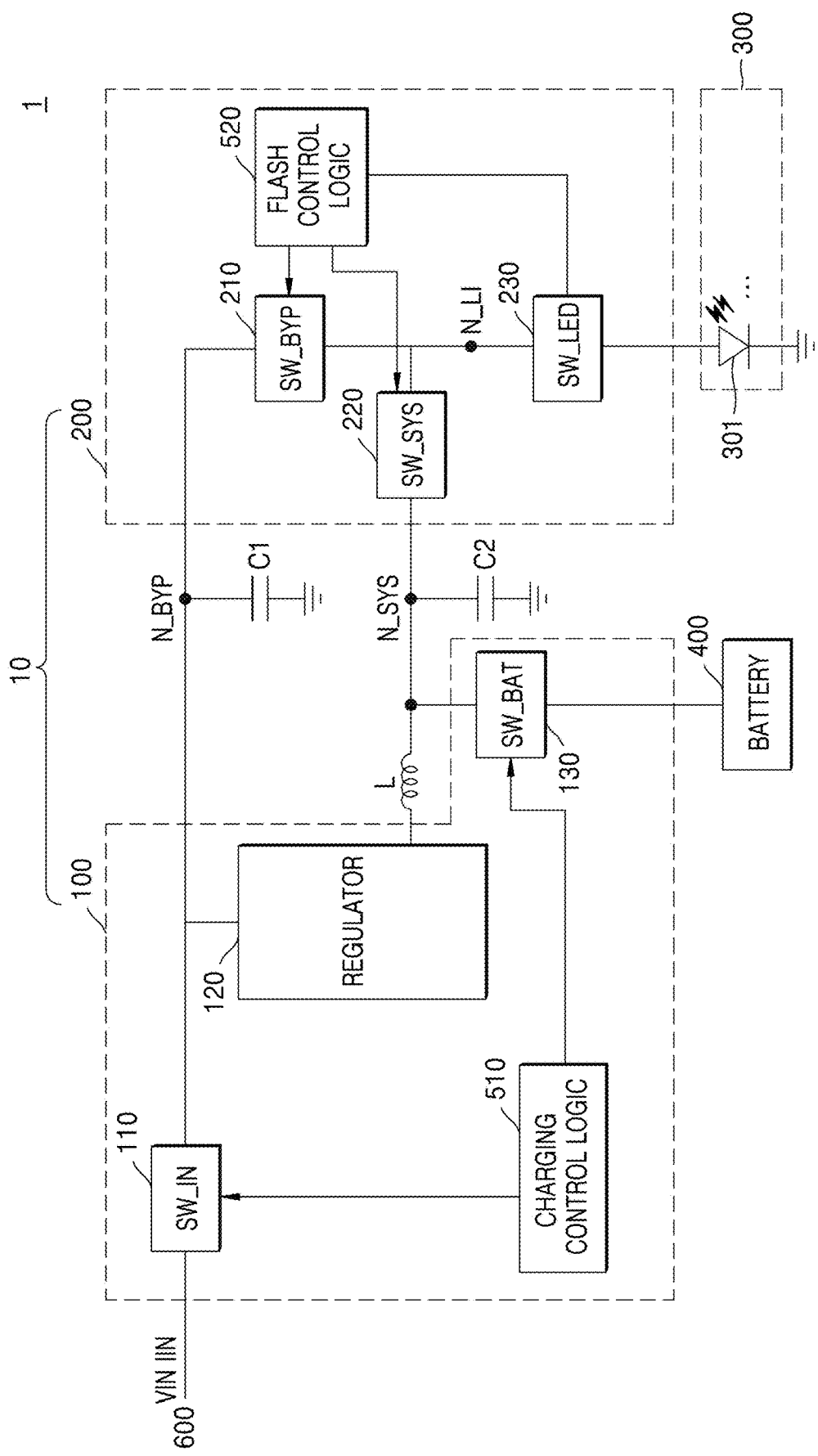
FIG. 2 is a circuit diagram of an integrated circuit (IC) according to an embodiment.
Figure 3:
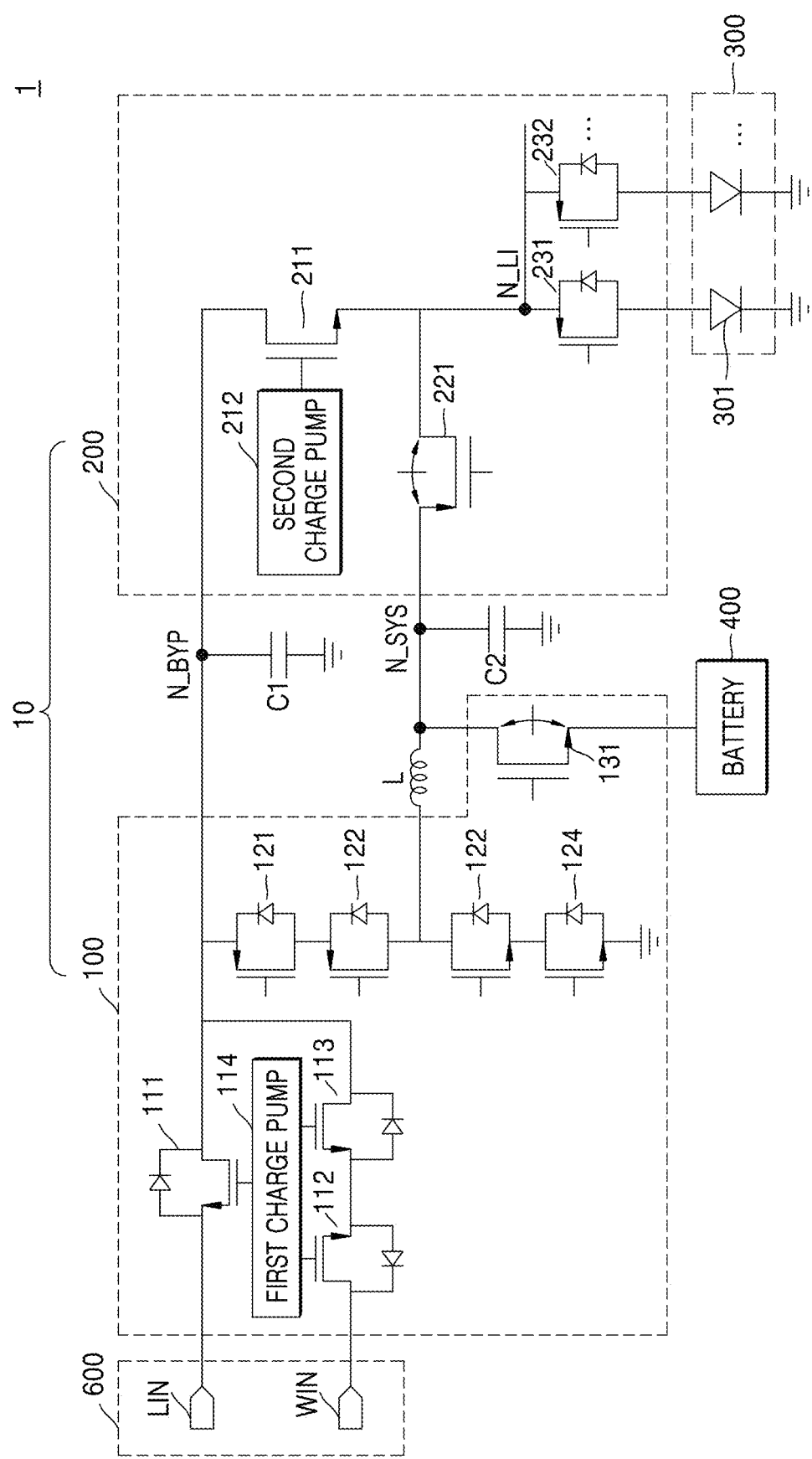
FIG. 3 is a circuit diagram illustrating an example implementation of the IC shown in FIG. 2, according to an embodiment.

FIG. 2 is a circuit diagram of an IC 10 according to an embodiment, and FIG. 3 is a circuit diagram of the IC 10 shown in FIG. 2, according to an embodiment.

Referring to FIG. 2, the IC 10 may include a charging circuit 100 and a flash driver 200 and also include an inductor L, a first capacitor C1, and/or a second capacitor C2. The charging circuit 100 may include an input switch 110, a regulator 120, a battery switch 130, and/or a charging control logic 510. The IC 10 may include a bypass node N_BYP and/or a system node N_SYS, which may be formed between the charging circuit 100 and the flash driver 200.

The charging circuit 100 may output a voltage and current received from the battery 400 and/or the external input power source 600 (e.g., VIN and/or IIN) through the system node N_SYS and/or the bypass node N_BYP. The charging control logic 510 may control overall operations of the charging circuit 100. For example, the charging control logic 510 may control operations of the input switch 110, the regulator 120, and/or the battery switch 130.

According to an embodiment, the regulator 120 may perform a buck operation of reducing a level of a voltage output by the external input power source 600 and outputting a voltage having the reduced level, and/or a boost operation of increasing a level of a voltage output by the battery 400 and outputting the voltage having the increased level.

In an example, the charging circuit 100 may apply the voltage and the current output by the external input power source 600 to the battery 400 through the system node N_SYS and charge the battery 400. In this case, the regulator 120 may perform a buck operation and step down a voltage level of the voltage output by the external input power source 600. In another example, the charging circuit 100 may apply the voltage and the current output by the battery 400 to the external input power source 600 through the system node N_SYS. In this case, the regulator 120 may perform a boost operation and step up a voltage level of the voltage output by the battery 400. In another example, the charging circuit 100 may apply the voltage and the current output by the battery 400 to the flash driver 200 through the system node N_SYS, the regulator 120, and/or the bypass node N_BYP. Similarly, the regulator 120 may perform a boost operation.

According to an embodiment, various internal components included in the electronic device 1 may be connected to the system node N_SYS. For example, a main Power Management Integrated Circuit (PMIC) chip (e.g., 2800 in FIG. 17) may be connected to the system node N_SYS. The main PMIC chip may be connected to various intellectual properties (IPs), such as at least one processor, an input/output (I/O) interface, a memory device, and/or a storage device of the electronic device 1, but the inventive concepts are not limited thereto.

The flash driver 200 may include a bypass switch 210, a system switch 220, a light-emitting device switch 230, and a flash control logic 520. A flash unit 300 may include at least one flash light-emitting device 301 (e.g., a light-emitting diode). The flash control logic 520 may control overall operations of the bypass switch 210, the system switch 220, and/or at least one light-emitting device switch 230. Here, the system switch 220 may be connected to a node connected to the battery 400 and/or another node, but the inventive concepts are not limited thereto.

According to an embodiment, the flash driver 200 may receive the voltage and/or the current, which are applied by the battery 400 and/or the external input power source 600, through the system node N_SYS and/or the bypass node N_BYP. The flash driver 200 may output the received voltage and/or current to the flash unit 300 and drive the flash unit 300.

According to an embodiment, to drive the flash unit 300, the flash driver 200 may turn on any one of the bypass switch 210 and/or the system switch 220 and turn off the remaining one thereof. In an example, when the voltage and the current are applied from the bypass node N_BYP, the flash control logic 520 may turn on the bypass switch 210 and the light-emitting device switch 230 and output a voltage and current to the flash unit 300. In another example, when the voltage and the current are applied from the system node N_SYS, the flash control logic 520 may turn on the system switch 220 and the light-emitting device switch 230 and output the voltage and the current to the flash unit 300. According to some example embodiments, the flash control logic 520 may control the flash driver 200 to prevent or reduce the likelihood of both of the bypass switch 210 and the system switch 220 being turned on simultaneously or contemporaneously. According to some example embodiments, the flash control logic 520 may control the flash driver 200 to only turn on one of the bypass switch 210 and/or the system switch 220 following a determined amount of time (e.g., delay) after the other of the bypass switch 210 and/or the system switch 220 has turned off. Accordingly, the flash driver 200 may avoid a scenario in which the bypass switch 210 and the system switch 220 are turned on together, causing a high voltage to be applied to the system node N_SYS, and thus, causing internal components of the electronic device 1 to be damaged.

The flash unit 300 may include at least one light-emitting device 301. For instance, the flash unit 300 may include a flash LED including at least one light-emitting device so that the electronic device 1 may capture images of a subject, but the inventive concepts are not limited thereto. The flash unit 300 may include a light-emitting unit including various kinds of light-emitting devices.

Referring to FIGS. 2 and 3, components included in the IC 10 may be implemented in various forms.

According to an embodiment, the input switch 110 may include a plurality of transistors 111, 112, and/or 113 configured to selectively output voltages and/or currents, which are output by the first external input power source LIN and/or the second external input power source WIN, and a first charge pump 114 configured to apply a voltage to gate terminals of the plurality of transistors 111, 112, and/or 113.

According to an embodiment, the regulator 120 may be implemented as various kinds of converters. For example, the regulator 120 may include at least one of a buck converter, a boost converter, and/or a buck-boost converter. Also, the regulator 120 may be implemented as including a plurality of transistors (e.g., 121, 122, 123, and/or 124).

According to an embodiment, the bypass switch 210 may include a transistor 211 configured to selectively provide a voltage and/or current of the bypass node N_BYP to a flash input node N_LI and a second charge pump 212 configured to apply a voltage and/or current to a gate terminal of the transistor 211.

According to an embodiment, the light-emitting device switch 230 may include at least one transistor (e.g., 231 and/or 232), and each of the transistors (e.g., 231 and/or 232) may control operations of the light-emitting device 301.

According to an embodiment, the battery switch 130 may be implemented as a body selection transistor 131, and the system switch 220 may be implemented as a body selection transistor 221. Each of the body selection transistors 131 and/or 221 may select a node to which a body terminal is to be connected, based on a voltage of a source terminal and/or a voltage of a drain terminal, as described in detail below with reference to FIGS. 8A and 8B.

The circuit configuration described with reference to FIGS. 2 and 3 is not limited to the above description and may include various types of circuit components that share the spirit and scope of the inventive concepts.

Figure 4:
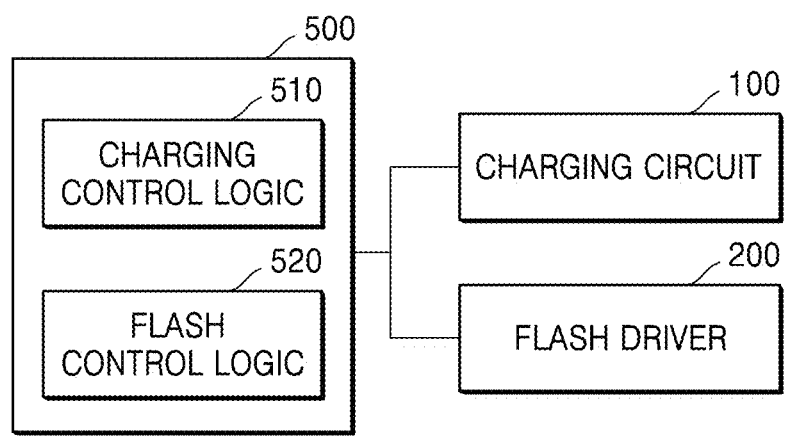
FIG. 4 is a block diagram of a control logic according to an embodiment.

FIG. 4 is a block diagram of a control logic according to an embodiment.

Referring to FIG. 4, each of a charging control logic 510 and/or a flash control logic 520 may be implemented as hardware, a combination of hardware and software, and/or firmware. Also, the charging control logic 510 may be integrated with the flash control logic 520 into one control logic 500 as shown in FIG. 4. The control logic 500 may control overall operations of the charging circuit 100 and/or the flash driver 200. The control logic 500 may be provided inside or outside the charging circuit 100 and/or the flash driver 200. According to some example embodiments, the control logic 500 may also be implemented as hardware, a combination of hardware and software, or firmware. According to some example embodiments, operations described herein as being performed by any or all of the electronic device 1, the IC 10, the charging circuit 100, the flash driver 200, the charging control logic 510, the flash control logic 520 and/or the control logic 500 may be performed by at least one processor executing program code that includes instructions corresponding to the operations. The instructions may be stored in a memory (e.g., a memory of the IC 10 and/or the electronic device 1). The term 'processor,' as used in the present disclosure, may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor; a multiprocessor, an application-specific integrated circuit (ASIC), and/or a field programmable gate array (FPGA) (e.g., "circuitry"). According to some example embodiments, operations described herein as being performed by either or both of the electronic device 1 or the control logic 500 may be performed by at least one first processor executing program code that includes instructions corresponding to the operations, and any or all of the IC 10, the charging circuit 100, the flash driver 200, the charging control logic 510 and/or the flash control logic 520 may be performed by at least one second processor executing program code that includes instructions corresponding to the operations.

Figure 5:
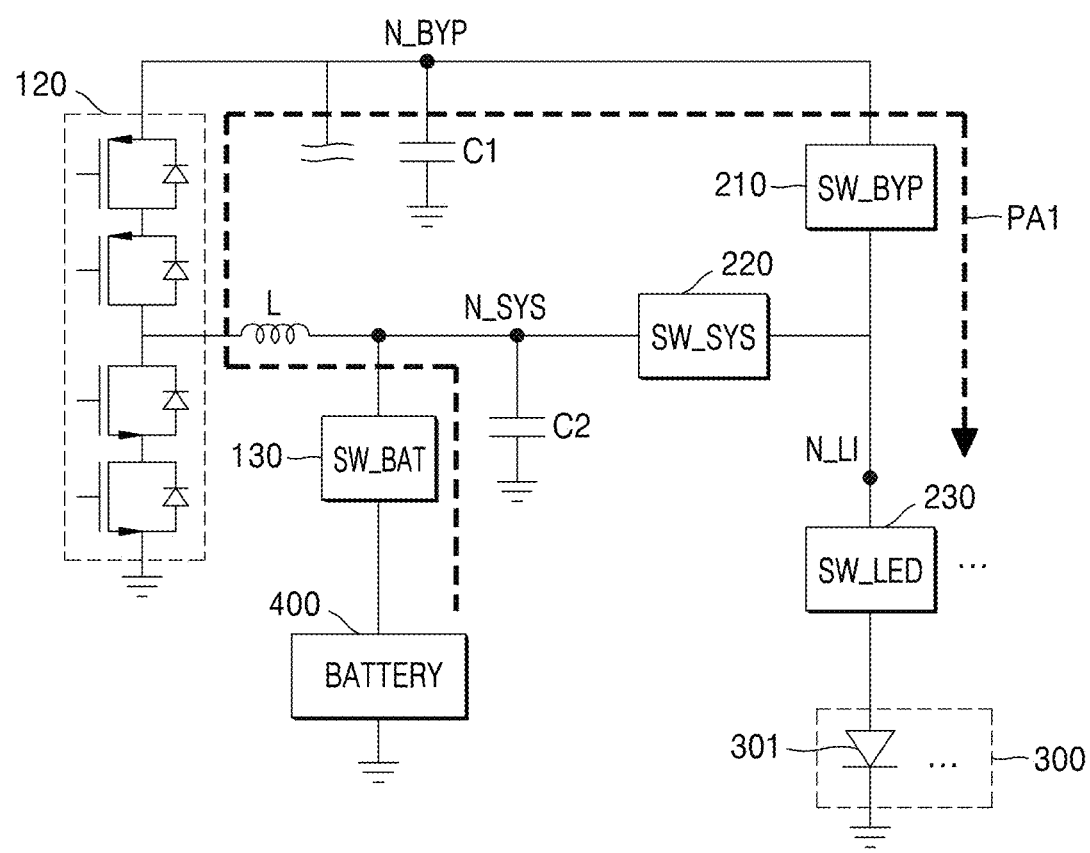
FIGS. 5, 6, and 7 are respectively circuit diagrams of a first current path, a second current path, and a third current path configured to drive a flash driver according to an embodiment.
Figure 6:
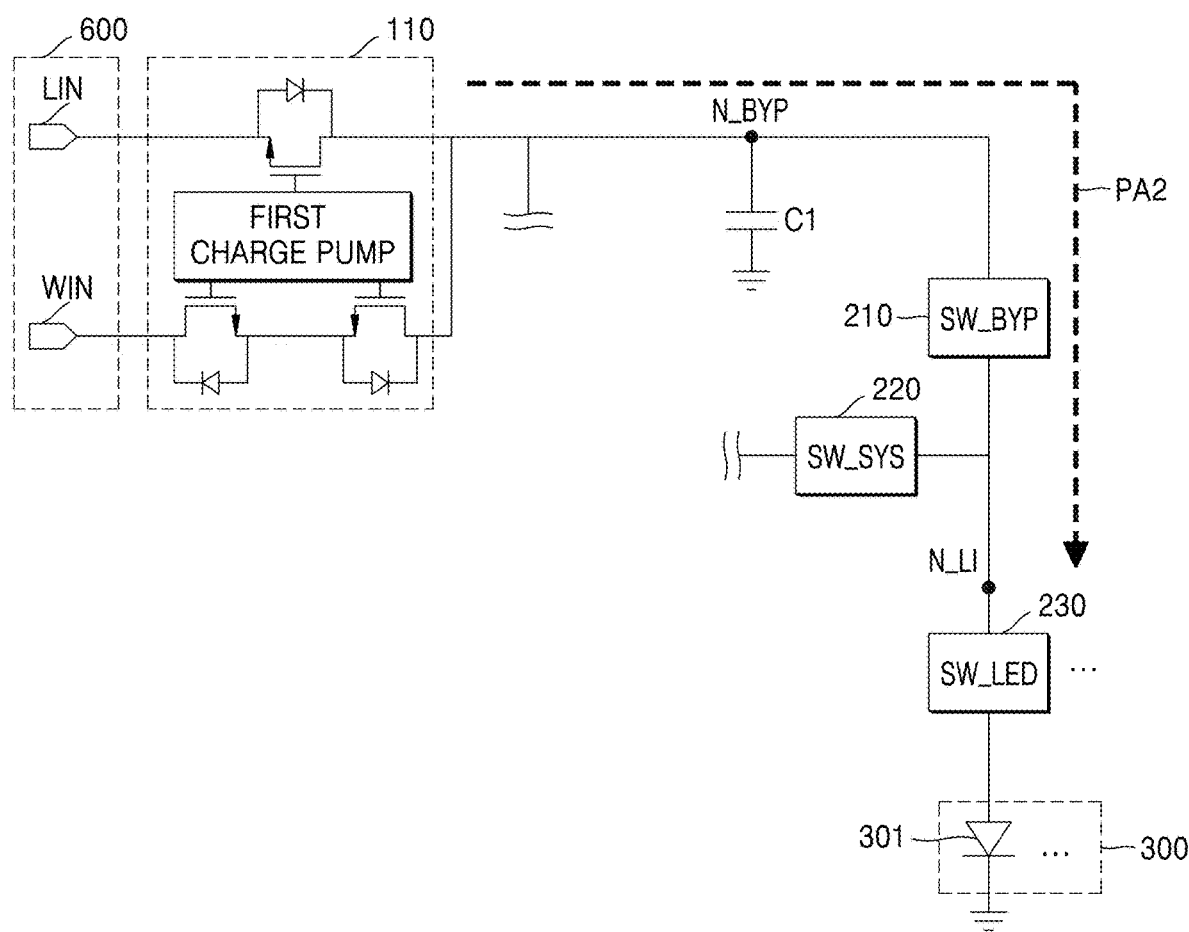
Figure 7:
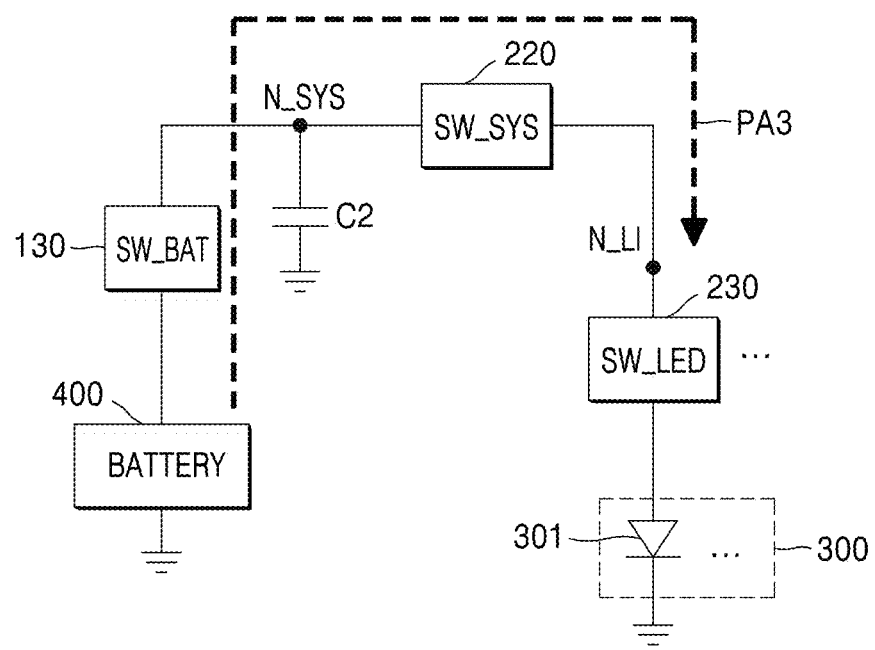

FIGS. 5, 6, and 7 are circuit diagrams of a first current path, a second current path, and a third current path, respectively, configured to drive a flash driver according to an embodiment. Hereinafter, FIGS. 5 to 7 will be described with reference to FIGS. 1 to 4 described above.

Referring to FIG. 5, in the first operation state, the control logic 500 may drive the flash driver 200 through the first current path PA1, which is formed based on a voltage and current output by the battery 400.

According to an embodiment, to form the first current path PA1, the control logic 500 may control the battery switch 130, the bypass switch 210, and the light-emitting device switch 230 to be turned on and control the system switch 220 to be turned off. Also, the control logic 500 may control the regulator 120 to perform a boost operation to step up the voltage output by the battery 400. The first current path PA1 may be a path formed to pass through the battery 400, the battery switch 130, the system node N_SYS, the regulator 120, the bypass node N_BYP, and the bypass switch 210.

Referring to FIG. 6, in the second operation state, the control logic 500 may drive the flash driver 200 through the second current path PA2, which is formed based on an external input voltage.

According to an embodiment, to form the second current path PA2, the control logic 500 may control the input switch 110, the bypass switch 210, and the light-emitting device switch 230 to be turned on and control the system switch 220 to be turned off. Also, the control logic 500 may control the regulator 120 to perform a buck operation so that the battery 400 may be charged using a voltage applied by an external input power source 600. The second current path PA2 may be a path formed to pass through the input switch 110, the bypass node N_BYP, and the bypass switch 210.

Referring to FIG. 7, in the third operation state, the control logic 500 may drive the flash driver 200 through the third current path PA3, which is formed based on a voltage output by the battery 400.

According to an embodiment, the control logic 500 may control the IC 10 to form the third current path PA3. To form the third current path PA3, the control logic 500 may control the battery switch 130, the system switch 220, and the light-emitting device switch 230 to be turned on and control the bypass switch 210 to be turned off. The third current path PA3 may be a path formed to pass through the battery switch 130, the system node N_SYS, and the system switch 220.

Figure 8A:
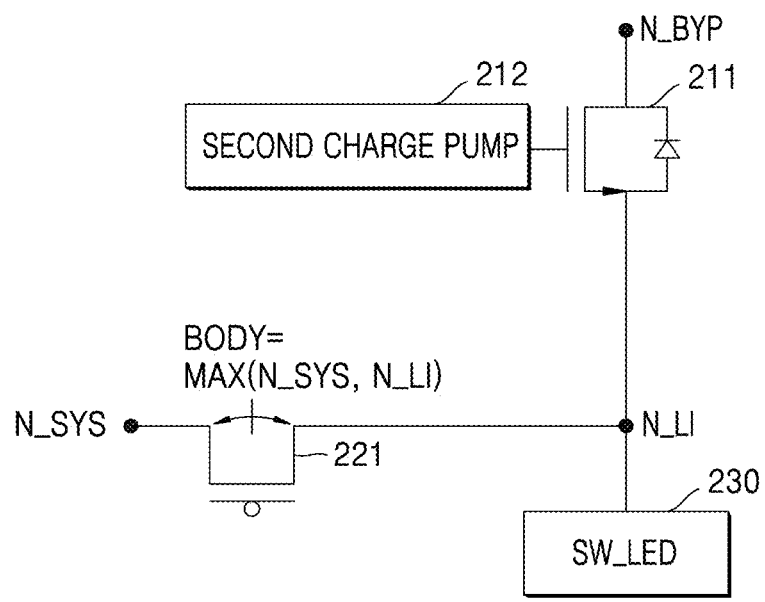
FIG. 8A is a circuit diagram of a system switch according to an embodiment.
Figure 8B:
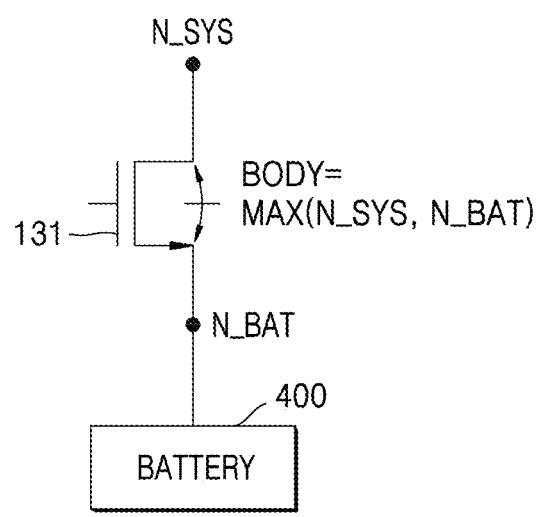
FIG. 8B is a circuit diagram of a battery switch according to an embodiment.

FIG. 8A is a circuit diagram of a system switch according to an embodiment, and FIG. 8B is a circuit diagram of a battery switch according to an embodiment.

Referring to FIGS. 8A and 8B, a system switch 220 may be implemented as a body selection transistor 221, and a battery switch 130 may be implemented as a body selection transistor 131. When an unintended current path is formed between the system node N_SYS and another node through a transistor connected adjacent to the system node N_SYS that may be connected to a main power manager, internal components of the electronic device 1 may be damaged. That is, an internal diode of the body selection transistor 221 may be made invisible to prevent or reduce the likelihood of a leakage current.

Referring to FIG. 8A, a first source/drain terminal of the body selection transistor 221 may be connected to the system node N_SYS, and a second source/drain terminal of the body selection transistor 221 may be connected to a flash input node N_LI. The control logic 500 may control a body electrode of the body selection transistor 221 to be connected to a node having a higher voltage level, from among a voltage level of the system node N_SYS and a voltage level of the flash input node N_LI.

Referring to FIG. 8B, a first source/drain terminal of the body selection transistor 131 may be connected to the system node N_SYS, and a second source/drain terminal of the body selection transistor 131 may be connected to a battery node N_BAT. The control logic 500 may control a body electrode of the body selection transistor 131 to be connected to a node having a higher voltage level from among a voltage level of the system node N_SYS and a voltage level of the battery node N_BAT.

Figure 9:
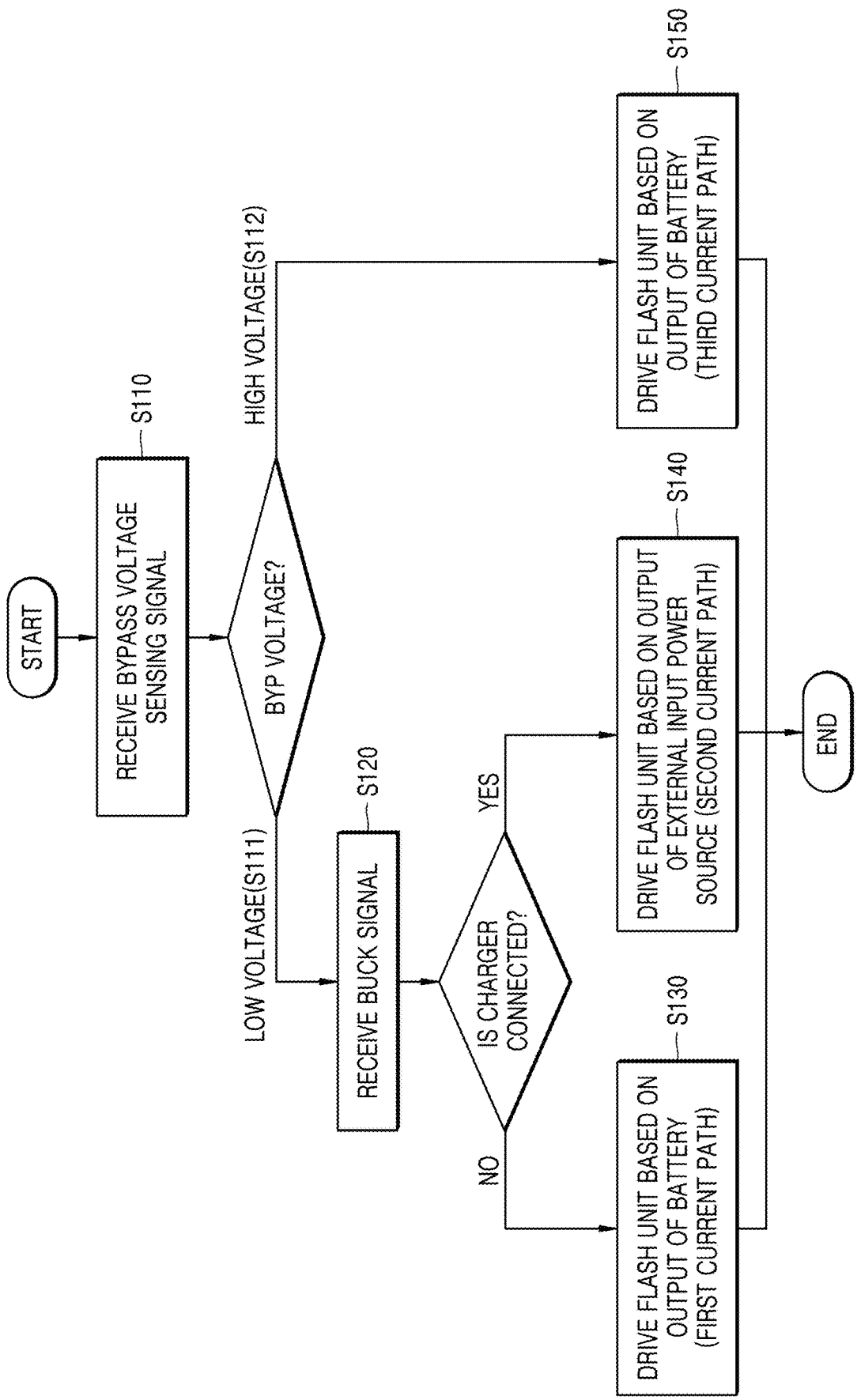
FIG. 9 is a flowchart illustrating a method of operating an IC, according to an embodiment.

FIG. 9 is a flowchart illustrating a method of operating an IC 10, according to an embodiment. Hereinafter, the method of operating the IC 10 will be described with reference to components shown in FIGS. 1 to 8B.

Referring to FIG. 9, the control logic 500 may detect a voltage level of the bypass node N_BYP (e.g., using a voltage sensor, etc.). The control logic 500 may transmit a bypass voltage sensing signal indicating the detected voltage level to the IC 10. The IC 10 may receive the bypass voltage sensing signal (S110). That is, the IC 10 may detect the bypass voltage sensing signal. The control logic 500 may set the bypass voltage sensing signal to logic low when the voltage level of the bypass node N_BYP is lower than a first determined value and set the bypass voltage sensing signal (e.g., BYP voltage) to logic high when the voltage level of the bypass node N_BYP is higher than a second determined value. According to some example embodiments, the first and second determined values may be either equal or different.

The IC 10 may receive a logic-low bypass voltage sensing signal (S111). The IC 10 may receive a buck signal from the control logic 500 (S120). That is, the IC 10 may detect the buck signal. In this case, the IC 10 may drive the flash unit 300 using an output of the external input power source 600 or the battery 400 based on the detected buck signal (S130 and S140).

The control logic 500 may detect that the electronic device 1 is in a buck mode. The buck mode may indicate an operation state in which the regulator 120 performs a buck operation based on a voltage applied by the external input power source 600. For example, the buck mode may correspond to a case in which power for charging the battery 400 is received from the external input power source 600 (e.g., the charger is connected to the IC 10). In this case, the control logic 500 may generate a logic-high buck signal.

Conversely, when the electronic device 1 is not in the buck mode, the control logic 500 may generate a logic-low buck signal. That is, the buck signal may be a signal indicating whether the regulator 120 will step down a level of a voltage output by the external input power source 600 to charge the battery 400.

When the IC receives a logic-low buck signal, the IC 10 may drive the flash unit 300 through the first current path PA1 based on a voltage and current output by the battery 400 (S130). For example, in a first operation state in which the electronic device 1 is not connected to a charger (e.g., the external input power source 600), the flash unit 300 may be driven based on power supplied by the battery 400.

When the IC 10 receives a logic-high buck signal, the IC 10 may drive the flash unit 300 through the second current path PA2 based on a voltage and current output by the external input power source 600 (S140). For example, the charger connected to the electronic device 1 may perform normal charging and have an appropriate voltage level. In this case, since a breakdown voltage of the flash driver 200 corresponds to an output voltage of the charger, even if the output voltage of the charger is applied to the flash driver 200, the flash driver 200 may be unlikely or less likely damaged.

According to some example embodiments, the IC 10 may receive a logic-high bypass voltage sensing signal (S112). In this case, the IC 10 may drive the flash unit 300 through the third current path PA3 based on the voltage and the current output by the battery 400 (S150). For instance, the charger connected to the electronic device 1 may perform high-speed charging and have a high voltage level. In this case, a device breakdown voltage of the flash driver 200 may be lower than an output voltage of the charger. When the output voltage of the charger is applied to the flash driver 200, the flash driver 200 may sustain damage. Accordingly, the IC 10 may form the third current path PA3 to replace the second current path PA2 so that the flash unit 300 may be driven based on the voltage and the current output by the battery 400.

Figure 10:
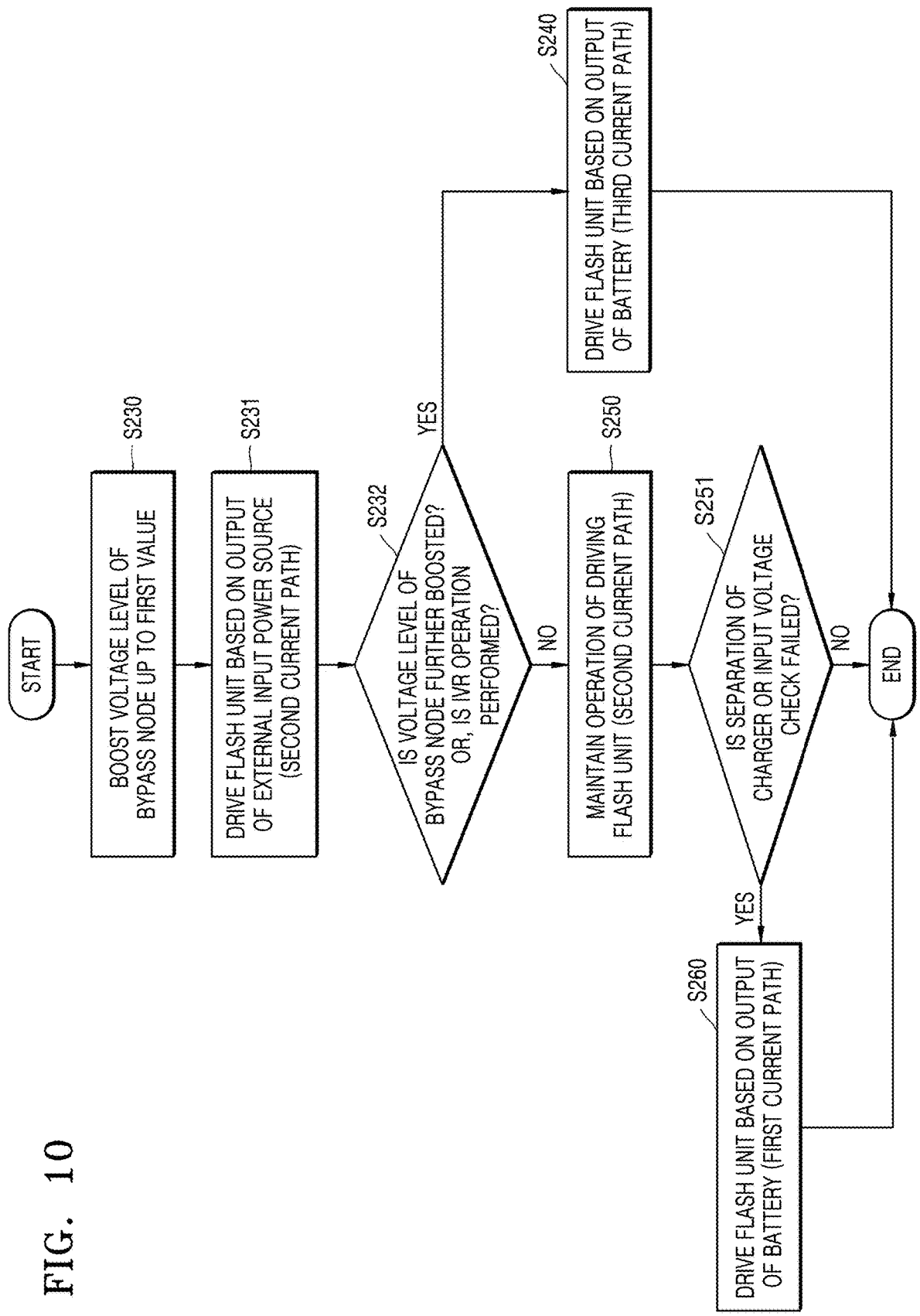
FIG. 10 is a flowchart illustrating an operation of selecting a second current path and a third current path, according to an embodiment.

FIG. 10 is a flowchart illustrating an operation of selecting a second current path and a third current path, according to an embodiment.

Referring to FIGS. 1, 2, 4, and 10, the external input power source 600 may be connected to the electronic device 1 and output a voltage and current to the electronic device 1. That is, the external input power source 600 may be placed in a situation of supplying power to the electronic device 1. In this case, the external input power source 600 may output a voltage having a high voltage level to charge the electronic device 1 at high speed, and a voltage level of the bypass node N_BYP may gradually increase.

To begin with, a voltage level of a bypass node N_BYP may be boosted and reach a determined first value (S230). In response to operation S230, the control logic 500 may detect that the electronic device 1 is in a second operation state (e.g., based on detecting that the voltage level has reached the determined first value, such as by using a voltage sensor, etc.) and control the IC 10 to drive the flash unit 300 through the second current path PA2 based on the output of the external input power source 600 (S231).

Thereafter, in operation S232, the control logic 500 may detect that the voltage level of the bypass node N_BYP further increases and exceeds the determined first value or that the electronic device 1 is in a state in which an IVR operation is to be performed (S232-Y). As an example, the control logic 500 may detect that the voltage level of the bypass node N_BYP reaches a determined second value, which is higher than the determined first value. In response to the detection operation S232-Y, the control logic 500 may detect that the electronic device 1 is in a third operation state and control the IC 10 to drive the flash unit 300 through the third current path PA3 based on an output of the battery 400 (S240). As another example, the control logic 500 may detect that an IVR operation is to be performed due to a capacity shortage of the external input power source 600 or other causes. In response to the detection operation, the control logic 500 may transmit a signal (e.g., an IVR signal) for directing the IC 10 to perform an IVR operation, and the IC 10 may drive the flash unit 300 through the third current path PA3 based on the output of the battery 400 in response to receiving the IVR signal (S240).

According to some example embodiments, the control logic 500 may sense that the voltage level of the bypass node N_BYP is not boosted or that the electronic device 1 should not perform the IVR operation (S232-N). In this case, the IC 10 may maintain the operation of driving the flash unit 300 as in operation S231 (S250). That is, the control logic 500 may control the IC 10 to drive the flash unit 300 through the second current path PA2 based on an output of the external input power source 600.

Thereafter, the control logic 500 may detect that the electronic device 1 is changed into a first operation state. For example, the control logic 500 may detect that a charger is separated from the electronic device 1. Thus, the control logic 500 may generate a logic-low buck signal and/or output a logic-low input voltage check signal (S251). When the IC 10 receives the logic-low buck signal and/or the logic-low input voltage check signal (S251-Y), the IC 10 may drive the flash unit 300 through the first current path PA1 based on a voltage and current output by the battery 400 (S260). The input voltage check signal may include a signal generated by the control logic 500 after the control logic 500 monitors whether a voltage is applied by the external input power source 600 to a node of the charging circuit 100 (e.g., whether a voltage higher than a threshold level is applied), which is adjacent to the external input power source 600.

Figure 11:
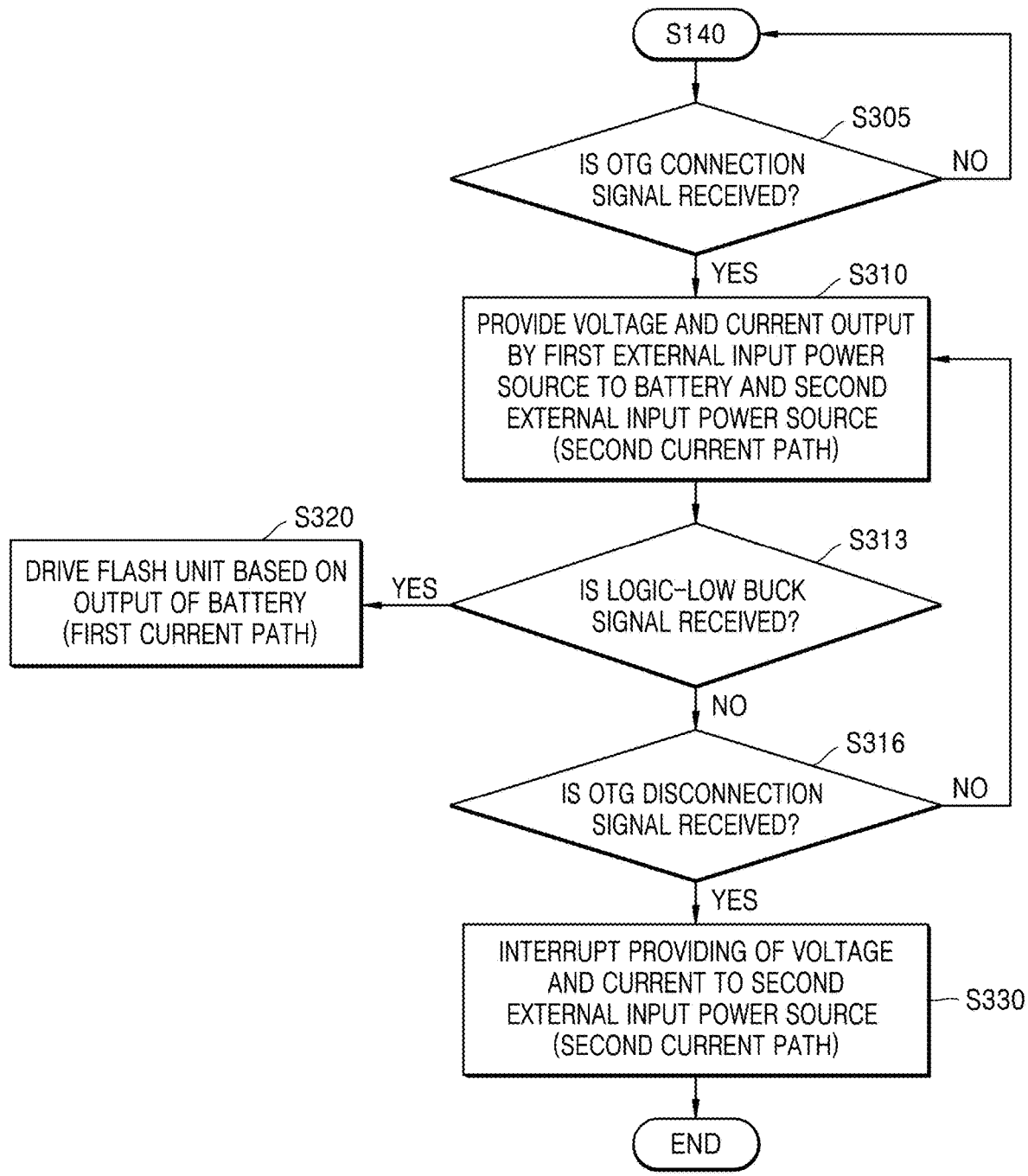
FIG. 11 is a flowchart illustrating a case in which a charger is connected to a first input power source and an on-the-go (OTG)-type external device is connected to a second input power source in an operating method according to an embodiment.

FIG. 11 is a flowchart illustrating a case in which a charger is connected to a first input power source LIN and an OTG-type external device is connected to a second input power source WIN in an operating method according to an embodiment.

Referring to FIGS. 1 and 11, the external input power source 600 may include the first external input power source LIN and the second external input power source WIN, which may be different external devices. For example, the first external input power source LIN may be a charger, and the second external input power source WIN may be an external device configured to provide data in an OTG manner. In another case, the first external input power source LIN may be connected to the electronic device 1 by wire, and the second external input power source WIN may be connected to the electronic device 1 wirelessly. When the charger (e.g., the first external input power source LIN) is used as the external input power source 600 and connected to the charging circuit 100, the IC 10 may drive the flash unit 300 through the second current path PA2 based on an output of the external input power source 600 (S140).

According to some example embodiments, when the second external input power source WIN is connected to the electronic device 1, the control logic 500 may detect that OTG connection has been established, generate an OTG connection signal, and output the OTG connection signal to the IC 10. The IC 10 may receive and detect the OTG connection signal (S305-Y). When the IC 10 does not receive the OTG connection signal (S305-N), a state of operation S140 may be maintained.

In response to the received OTG connection signal, the IC 10 may provide a voltage and current, which is output by the first external input power source LIN, to the battery 400 and the second external input power source WIN (S310). In this case, since the charging of the battery 400 with the voltage output by the first external input power source LIN is included in the second operation state, the IC 10 may drive the flash unit 300 through the second current path PA2 based on the voltage and the current output by the first external input power source LIN. According to some example embodiments, the IC 10 may provide voltage and current received from the first external input power source LIN to the second external input power source WIN via a wired connection and/or a wireless connection with the second external input power source WIN.

Thereafter, the IC 10 may receive and detect a logic-low buck signal from the control logic 500 (S313-Y). For example, the first input power source LIN may be disconnected from the electronic device 1. In response to the received logic-low buck signal, the IC 10 may drive the flash unit 300 through the first current path PA1 based on an output of the battery 400 (S320).

The IC 10 may not receive the logic-low buck signal from the control logic 500 (S313-N), but may receive an OTG disconnection signal (S316-Y). That is, the IC 10 may detect the OTG disconnection signal. The control logic 500 may output the OTG disconnection signal to the IC 10 when the external device connected to the second input power source WIN is disconnected from the electronic device 1. In response to the OTG disconnection signal, the IC 10 may interrupt an operation of providing a voltage and current to the second external input power source WIN (S330). According to some example embodiments, since the first external input power source LIN still remains connected to the electronic device 1, the IC 10 may drive the flash unit 300 through the second current path PA2 (S330).

Figure 12:
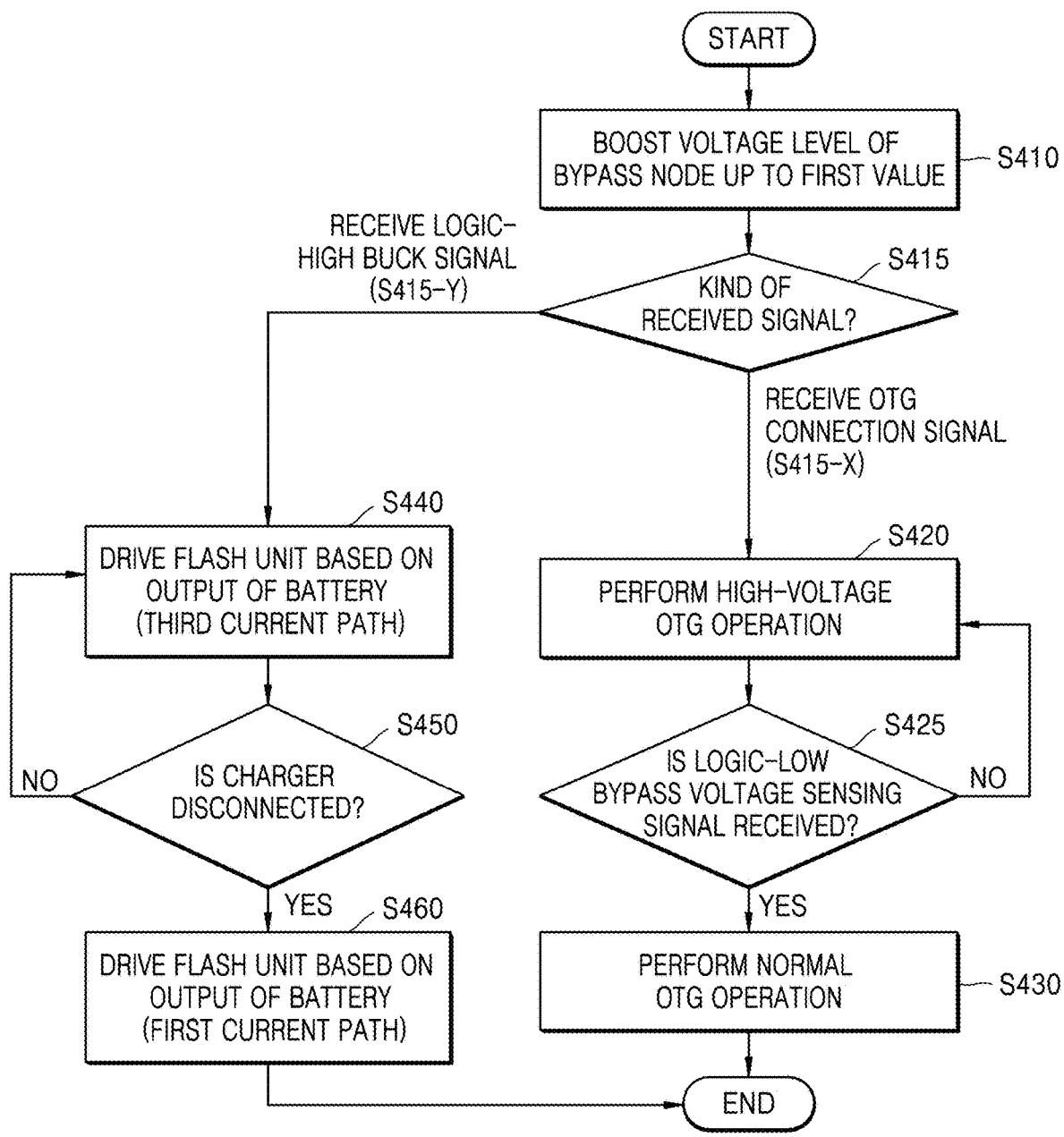
FIG. 12 is a flowchart illustrating a high-voltage OTG mode and a normal OTG mode according to an embodiment.

FIG. 12 is a flowchart illustrating a high-voltage OTG mode and a normal OTG mode according to an embodiment.

Referring to FIGS. 1, 2, 4, and 12, the IC 10 may receive a logic-high bypass voltage sensing signal from the control logic 500 (S410). That is, the IC 10 may detect the logic-high bypass voltage sensing signal. For example, one of the first external input power source LIN and/or the second external input power source WIN may be an external device configured to transmit data in an OTG manner and output a high voltage. That is, as the external device outputs the high voltage, a voltage level of the bypass node N_BYP may increase.

Thereafter, an OTG-type external device may be connected to the electronic device 1 and thus, the IC 10 may receive an OTG connection signal from the control logic 500 (S415-X). The control logic 500 may control the electronic device 1 to perform a high-voltage OTG operation (S420). The high-voltage OTG operation may include receiving data in the OTG manner by the electronic device 1 and driving the flash unit 300 by the IC 10 through the third current path PA3 based on an output of the battery 400. Also, when the control logic 500 receives a logic-low bypass voltage sensing signal (S425-Y), the control logic 500 may control the electronic device 1 to perform a normal OTG operation (S430). The normal OTG operation may include receiving data in the OTG manner by the electronic device 1 and driving the flash unit 300 by the IC 10 through the second current path PA2 based on an output of the external input power source 600.

The control logic 500 may detect that the electronic device 1 is connected to a charger and transmit a logic-high buck signal to the IC 10, and the IC 10 may receive the logic-high buck signal (S415-Y). In this case, similar to operation S150 of FIG. 9, the IC 10 may drive the flash unit 300 through the third current path PA3 based on a voltage and current output by the battery 400 (S440). When the electronic device 1 is disconnected from the charger (S450-Y), similar to operation S130 of FIG. 9, the IC 10 may drive the flash unit 300 through the first current path PA1 based on a voltage and current output by the battery 400. For example, when the electronic device 1 is disconnected from the charger, the IC 10 may receive the logic-low buck signal.

Figure 13:
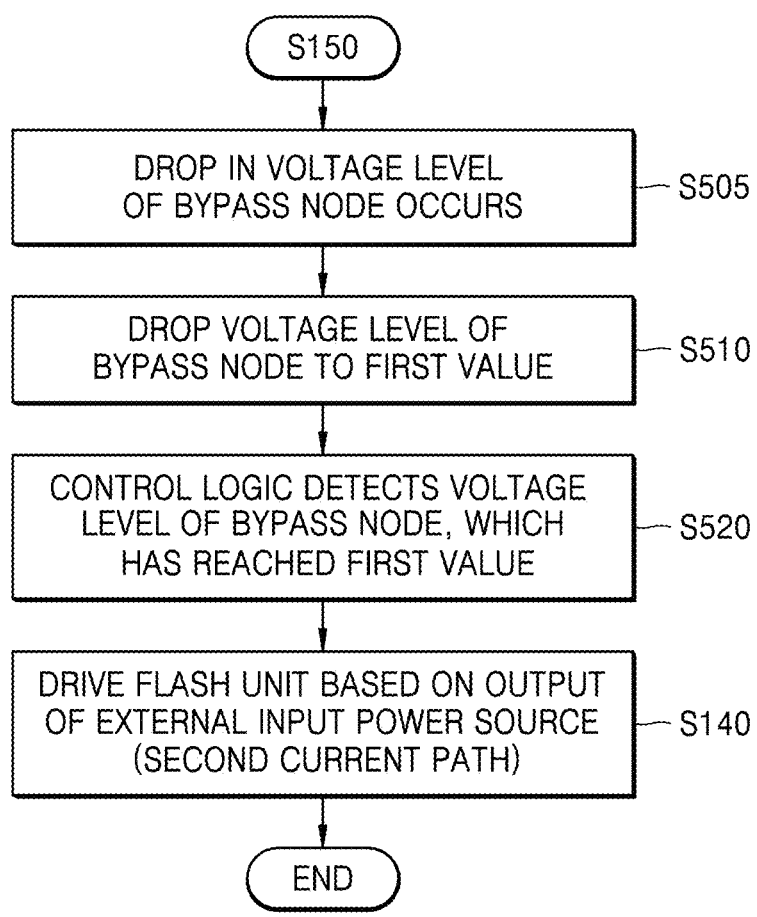
FIG. 13 is a flowchart illustrating an example in which a bypass node voltage drops in an operating method according to an embodiment.

FIG. 13 is a flowchart illustrating a case in which a voltage of a bypass node N_BYP drops in an operating method according to an embodiment.

Referring to FIGS. 1, 2, and 13, while the IC 10 is driving the flash unit 300 based on the third current path PA3 (e.g., operations S150, S240, and S440), an event in which a voltage level of the bypass node N_BYP drops may occur (S505). For example, an output voltage of the external input power source 600 may drop for a certain reason (e.g., a reason extraneous to the operation of the IC 10). Alternatively, the external input power source 600, which has supported fast charging, may be changed to support only normal charging. Thus, the voltage level of the bypass node N_BYP may drop and reach a determined first value (S510). The control logic 500 may detect the voltage level of the bypass node N_BYP, which has reached the first value (S520). In accordance with the detected result, the control logic 500 may control the IC 10 to drive the flash unit 300 through the second current path PA2 based on a voltage and current output by the external input power source 600 (e.g., by transmitting a logic-low bypass voltage sensing signal to the IC 10) (S140).

Figure 14:
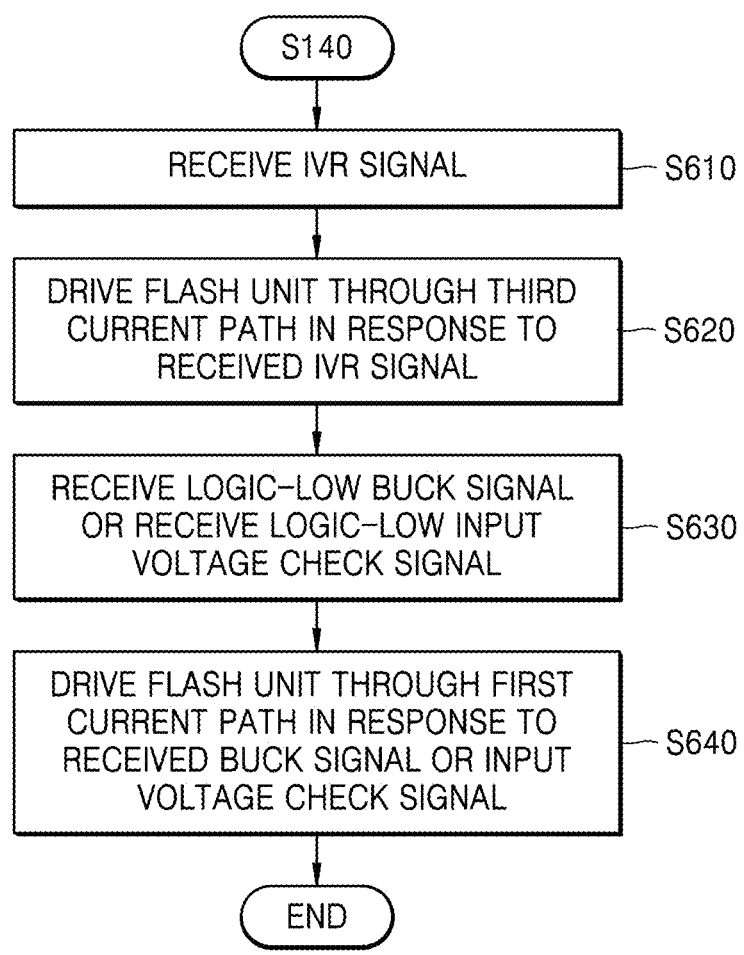
FIG. 14 is a flowchart illustrating an operation of receiving an input voltage regulation signal and a buck signal, according to an embodiment.

FIG. 14 is a flowchart of an operation of receiving an input voltage regulation signal and/or a buck signal, according to an embodiment.

Referring to FIGS. 1, 2, 4, and 14, the IC 10 may receive and detect an IVR signal (S610). For example, when the electronic device 1 operates in a second operation state, the IC 10 may drive the flash unit 300 through the second current path PA2. In this case, when a charger (e.g., the external input power source 600) connected to the electronic device 1 has insufficient capacity and/or an input voltage is abnormally reduced, a reverse current may be output from the electronic device 1 to the external input power source 600, and thus, the electronic device 1 and the external input power source 600 may be damaged. Thus, the control logic 500 may detect an abnormality in the input voltage of the charging circuit 100 and/or the voltage of the bypass node N_BYP and output the IVR signal to the IC 10.

The IC 10 may drive the flash driver 200 through the third current path PA3 and perform an IVR operation in response to the received IVR signal (S620). During the IVR operation, a voltage output by the battery 400 may be reverse-boosted, and the reverse-boosted voltage may be provided through the bypass node N_BYP to the external input power source 600. Accordingly, since the regulator 120 has already performed the reverse-boost operation, the first current path PA1 may not be formed. Also, since the external input power source 600 is in an abnormal state, the second current path PA2 may not be formed. Thus, the IC 10 may drive the flash unit 300 through the third current path PA3 based on a voltage and current output by the battery 400.

The IC 10 may receive and detect a logic-low buck signal and/or a logic-low input voltage check signal from the control logic 500 (S630). For example, the control logic 500 may transmit the logic-low signals to the IC 10 due to the separation of the external input power source 600 from the electronic device 1 (e.g., disconnection) and/or other causes.

The IC 10 may drive the flash unit 300 through the first current path PA1 in response to the received buck signal and/or the received input voltage check signal (S640). For example, when the external input power source 600 is separated from the electronic device 1, the IC 10 may drive the flash unit 300 based on the voltage and the current output by the battery 400.

Figure 15:
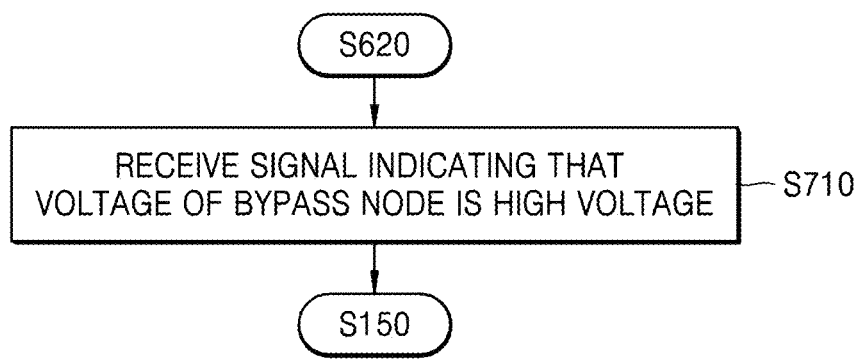
FIG. 15 is a flowchart illustrating an operation of receiving an input voltage regulation signal and a bypass node voltage signal, according to an embodiment.

FIG. 15 is a flowchart of an operation of receiving an input voltage regulation signal and a bypass node voltage signal in an operating method according to an embodiment.

Referring to FIGS. 1, 2, 4, 14 and 15, the IC 10 may drive the flash unit 300 through the third current path PA3 in response to the received IVR signal (S620). In this case, the control logic 500 may control the regulator 120 to perform a reverse-boost operation so that the IC 10 may perform an IVR operation.

Referring to FIG. 15, the IC 10 may receive and detect a logic-high bypass voltage sensing signal from the control logic 500 (S710). The control logic 500 may detect that a voltage of the bypass node N_BYP has a second voltage level, which is relatively high, and determine that the electronic device 1 is in the third operation state in which a charger (e.g., the external input power source 600) configured to support fast charging is connected to the electronic device 1. Thus, the IC 10 may drive the flash unit 300 through the third current path PA3 based on a voltage and current output by the battery 400 (S150).

Both operations S620 and S150 described above may be similar operations of driving the battery 400 through the third current path PA3. However, in operation S620, since the IC 10 performs the IVR operation, the regulator 120 may perform the reverse-boost operation. In comparison to operation S620, in operation S150, since the electronic device 1 is in the third operation state in which fast charging is performed, the regulator 120 may perform the buck operation.

Figure 16:
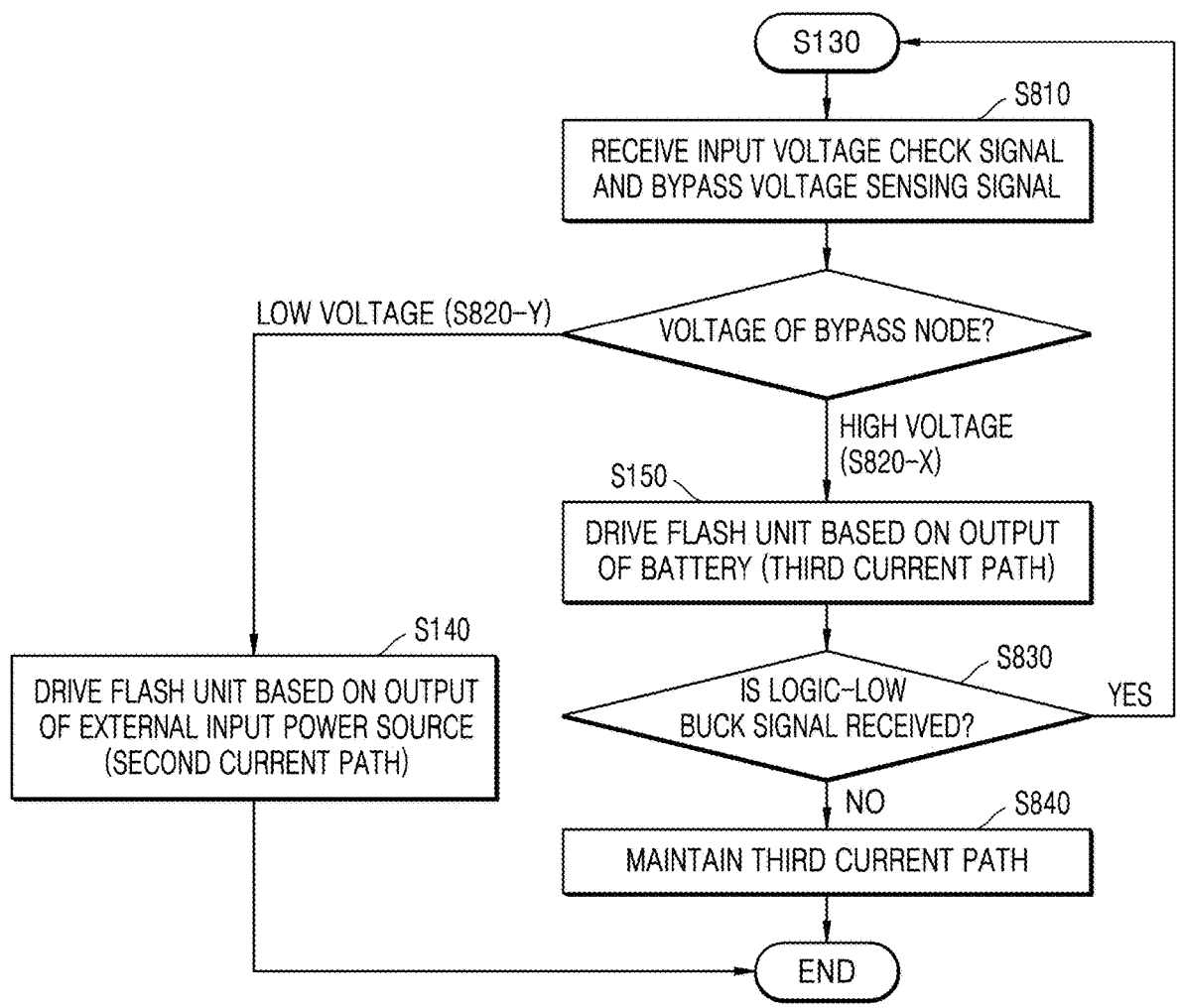
FIG. 16 is a flowchart illustrating an operation of changing an operation state of an IC from a first operation state into a second operation state or a third operation state, according to an embodiment.

FIG. 16 is a flowchart illustrating an operation of changing an operation of an IC from a first operation state into a second operation state or a third operation state, according to an embodiment.

Referring to FIGS. 9 and 16, the IC 10 may drive a flash unit 300 through a first current path PA1 based on a voltage and current output by a battery 400 (S130). In this case, the IC 10 may receive and detect an input voltage check signal and/or a bypass voltage sensing signal (S810). For example, the input voltage check signal may be logic high. That is, the control logic 500 may detect that the external input power source 600 is connected to the electronic device 1 and transmit a logic-high input voltage check signal to the IC 10.

The IC 10 may receive a logic-high bypass voltage sensing signal (S820-X). Since the external input power source 600 is connected to the electronic device 1 and the bypass node N_BYP has a high voltage level, operation S150 may be performed. That is, the IC 10 may drive the flash unit 300 through a third current path PA3 based on a voltage and current output by the battery 400 (S150).

Thereafter, when the IC 10 receives a logic-low buck signal (S830-Y), the IC 10 may drive the flash unit 300 through the first current path PA1 again (S130). According to some example embodiments, when the IC 10 does not receive the logic-low buck signal (S830-N), the IC 10 may maintain the operation of driving the flash unit 300 through the third current path PA3 based on the voltage and the current output by the battery 400 (S840).

According to some example embodiments, the IC 10 may receive a logic-low bypass voltage sensing signal (S820-Y). In this case, since the external input power source 600 is connected to the electronic device 1 and the bypass node N_BYP has a low voltage level, operation S140 may be performed. That is, the IC 10 may drive the flash unit 300 through a second current path PA2 based on an output of the external input power source 600 (S140).

Figure 17:
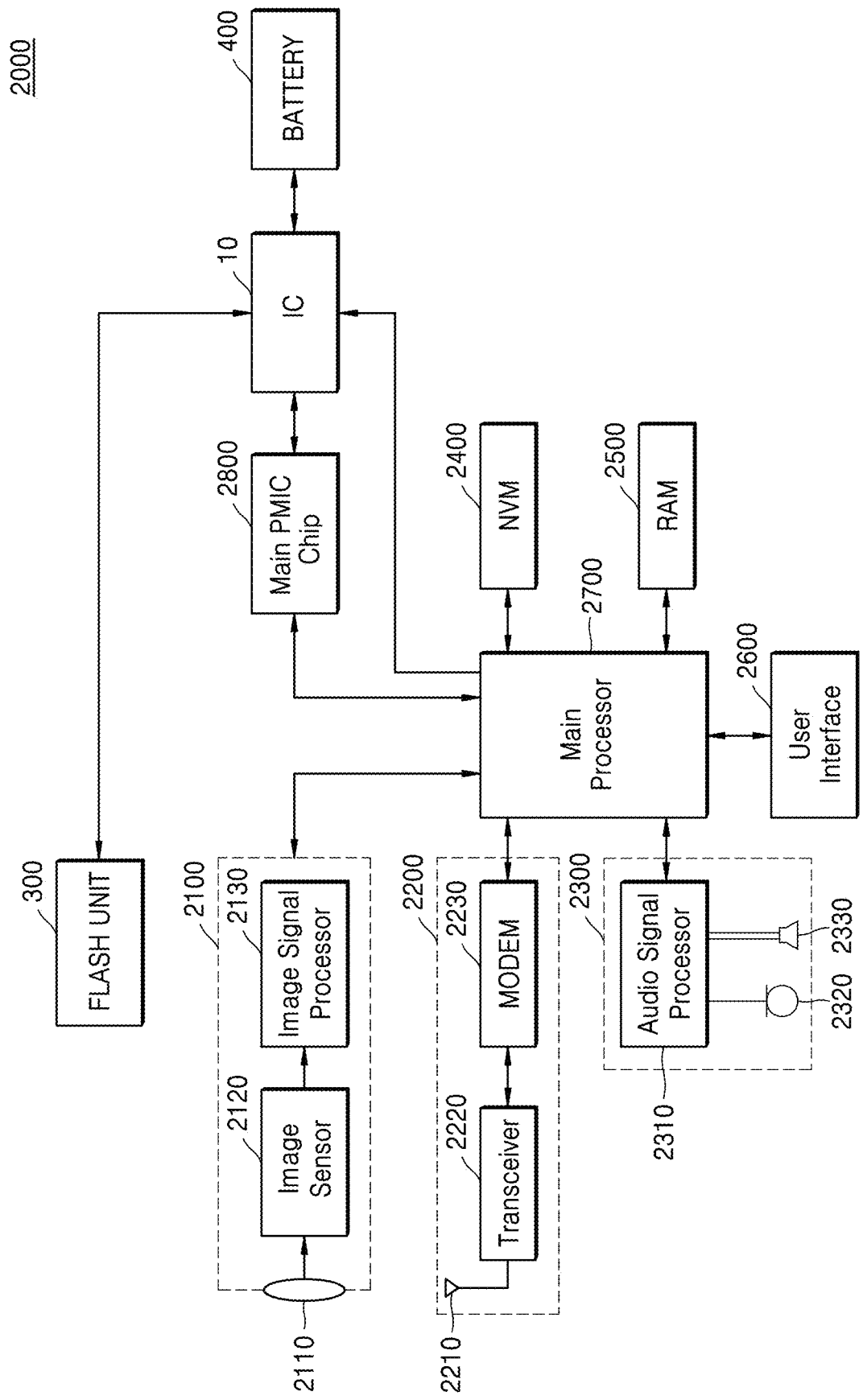
FIG. 17 is a block diagram of a transportable electronic device including an IC according to an embodiment.

FIG. 17 is a block diagram of a transportable electronic device 2000 including an IC according to an embodiment.

Referring to FIG. 17, the transportable electronic device 2000 may include a camera unit 2100, a wireless communicator 2200, an audio processor 2300, a non-volatile memory (NVM) 2400, random access memory (RAM) 2500, a user interface 2600, a main processor 2700, a main power-management IC (PMIC) chip 2800, an IC 10, a flash unit 300, and/or a battery 400. For example, the transportable electronic device 2000 may include a portable terminal, a portable personal assistant (PDA), a personal media player (PMP), a digital camera, a smartphone, a tablet, and/or a wearable device.

The camera unit 2100 may receive light through a lens 2110. An image sensor 2120 and an image signal processor 2130 included in the camera unit 2100 may generate images based on the received light. The flash unit 300 may irradiate light (e.g., under low light conditions). In some example embodiments, the flash unit 300 may be included in the camera unit 2100.

The wireless communicator 2200 may include an antenna 2210, a transceiver 2220, and/or a modem 2230. The wireless communicator 2200 may communicate with the outside of (e.g., with another device external to) the transportable electronic device 2000 according to various wireless communication protocols, such as fifth generation (5G), long-term evolution (LTE), world interoperability for microwave access (WiMax), global system for mobile communication (GSM), code division multiple access (CDMA), Bluetooth, near-field communication (NFC), wireless fidelity (WiFi), and/or radio-frequency identification (RFID).

The audio processor 2300 may process an audio signal using an audio signal processor 2310. The audio processor 2300 may receive an audio input through a microphone 2320 or provide an audio output through a speaker 2330.

The non-volatile memory 2400 may store data to be retained, regardless of power supply. As an example, the non-volatile memory 2400 may include at least one of NAND-type flash memory, phase-change RAM (PRAM), magnetoresistive RAM (MRAM), resistive RAM (Re-RAM), ferroelectric RAM (FRAM), and/or NOR-type flash memory.

The RAM 2500 may store data used for operations of the transportable electronic device 2000. As an example, the RAM 2500 may be used as a working memory, an operation memory, and/or a buffer memory of the transportable electronic device 2000. The RAM 2500 may temporarily store data that has been processed and/or is to be processed by the main processor 2700.

The user interface 2600 may provide an interface between a user and the transportable electronic device 2000 via the control of the main processor 2700. For example, the user interface 2600 may include an input interface, such as a keyboard, a keypad, a button, a touch panel, a touch screen, a touch pad, a touch ball, a camera, a microphone, a gyroscope sensor, a vibration sensor, and/or the like. Also, the user interface 2600 may include an output interface such as a display device and/or a motor (e.g., a haptic motor). For example, the display device may include at least one of a liquid crystal display (LCD), an LED display, an organic light-emitting device (OLED) display, and/or an active-matrix OLED (AMOLED) display.

The main processor 2700 may control overall operations of the transportable electronic device 2000. Each of the camera unit 2100, the wireless communicator 2200, the audio processor 2300, the non-volatile memory 2400, the RAM 2500, and/or the IC 10 may perform an operation in response to a user command provided through the user interface 2600 via the control of the main processor 2700. Alternatively, each of the camera unit 2100, the wireless communicator 2200, the audio processor 2300, the non-volatile memory 2400, the RAM 2500, and/or the IC 10 may provide services to a user through the user interface 2600 via the control of the main processor 2700. The main processor 2700 may be implemented as a System-on-Chip (SoC). For example, the main processor 2700 may include an application processor. According to some example embodiments, the control logic 500 may be implemented by the main processor 2700.

The main PMIC chip 2800 may manage power used for operations of the transportable electronic device 2000. The main PMIC chip 2800 may be connected to the IC 10 through a system node N_SYS. For instance, the main PMIC chip 2800 may convert voltages provided by the external input power source 600 and the charging circuit 100 into stable voltages. The main PMIC chip 2800 may provide a stable voltage to other components (or other IPs) of the transportable electronic device 2000. For example, each of the camera unit 2100, the wireless communicator 2200, the audio processor 2300, the non-volatile memory 2400, the RAM 2500, the user interface 2600, and/or the main processor 2700 included in the transportable electronic device 2000 may operate using the stable voltage provided by the main PMIC chip 2800.

The IC 10 may be implemented according to some example embodiments described with reference to FIGS. 1 to 16. The IC 10 may drive the flash unit 300 through one of a first current path PA1, a second current path PA2, and/or a third current path PA3.

As described above with reference to FIGS. 1 to 17, the IC 10 may use various current paths to drive the flash unit 300. In addition, by changing various current paths to correspond to various states of a voltage output by the external input power source 600, abnormal operations (e.g., undesired flashing of the flash unit 300) may be prevented or reduced.

Typical example embodiments of the inventive concepts are disclosed in the above description and the drawings. Although specific terms are employed, they are used in a generic and descriptive sense only and not for purposes of limitation. It will be understood by those of ordinary skill in the art that various changes in form and details may be made to the disclosed embodiments without departing from the spirit and scope of the inventive concepts as defined by the following claims.

What is claimed is:

1. An integrated circuit comprising:
   circuitry configured to,
   drive a flash unit comprising at least one light-emitting device, by providing a supply voltage to the flash unit based on an external input power source or a battery, the supply voltage being provided along one of a plurality of different current paths corresponding to a plurality of operation states, no voltage being received from the external input power source in a first operation state among the plurality of operation states, a first voltage level being received from the external input power source in a second operation state among the plurality of operation states, and a second voltage level being received from the external input power source in a third operation state among the plurality of operation states, the circuitry including at least one switch configured to connect the external input power source and the battery to the flash unit; and
   charge the battery based on a charging voltage received from the external input power source.

2. The integrated circuit of claim 1, wherein the circuitry is configured to:
   drive the flash unit through a first current path among the plurality of different current paths based on a battery voltage received from the battery in the first operation state,
   drive the flash unit through a second current path among the plurality of different current paths based on the charging voltage received from the external input power source in the second operation state, and
   drive the flash unit through a third current path among the plurality of different current paths based on the battery voltage received from the battery in the third operation state.

3. The integrated circuit of claim 1, wherein
   the circuitry comprises a battery switch configured to control the charging voltage and a charging current transmitted to the battery,
   the circuitry is configured to turn on the battery switch to form a third current path among the plurality of different current paths by which a battery voltage and battery current are provided from the battery through a system node to the flash unit in the third operation state, and
   the system node is connected to at least one external intellectual property (IP).

4. The integrated circuit of claim 1, wherein
   the plurality of different current paths comprise a first current path, a second current path, and a third current path,
   the circuitry comprises a regulator,
   the first current path extends from the battery via a bypass node and the regulator to the flash unit,
   the second current path extends from the external input power source via the bypass node to the flash unit, and
   the third current path extends from the battery via a system node to the flash unit, the system node being connected to at least one external intellectual property (IP).

5. The integrated circuit of claim 4, wherein the circuitry comprises a system switch between a light-emitting device switch located adjacent to the flash unit and the system node, the system switch being configured to apply a battery voltage received from the battery through the system node to the flash unit.

6. The integrated circuit of claim 5, wherein the circuitry is configured to:
   turn on the system switch to form the second current path in the second operation state, and
   turn off the system switch to form the third current path in the third operation state.

7. The integrated circuit of claim 5, wherein
   the system switch comprises a body selection transistor, and a first source or drain terminal of the body selection transistor is connected to the system node, a second source or drain terminal of the body selection transistor is connected to a flash input node, and a body terminal of the body selection transistor is configured to connect to a node having a higher voltage level among the system node and the flash input node.

8. The integrated circuit of claim 7, wherein
the circuitry comprises a bypass switch connected between the flash input node and the bypass node, and
the circuitry is configured to control the bypass switch and the system switch such that the bypass switch and the system switch are not turned on simultaneously.

9. The integrated circuit of claim 8, wherein the circuitry is configured to
turn on the system switch following a determined amount of time after the bypass switch is turned off, and
turn on the bypass switch following the determined amount of time after the system switch is turned off.

10. A method of operating an integrated circuit configured to drive a flash unit, the method comprising:
first driving the flash unit based on a charging voltage and a charging current received from at least one external input power source or a battery voltage and a battery current received from a battery when a first bypass voltage sensing signal is logic low, the first bypass voltage sensing signal indicating a bypass voltage of a bypass node, the integrated circuit including at least one switch configured to connect the at least one external input power source and the battery to the bypass node; and
second driving the flash unit based on the battery voltage and the battery current received from the battery when the first bypass voltage sensing signal is logic high.

11. The method of claim 10, wherein the first driving comprises:
third driving the flash unit through a first current path among a plurality of different current paths based on the battery voltage and the battery current when the at least one external input power source is not connected to the integrated circuit; and
fourth driving the flash unit through a second current path among the plurality of different current paths based on the charging voltage and the charging current when the at least one external input power source is connected to the integrated circuit.

12. The method of claim 11, further comprising:
driving the flash unit through a third current path among the plurality of different current paths in response to receiving an initial voltage regulation (IVR) signal during the fourth driving, the IVR signal indicating IVR operation has been detected.

13. The method of claim 11, wherein
the at least one external input power source comprises a first external input power source and a second external input power source,
the fourth driving comprises:
receiving the charging voltage and the charging current from the first external input power source,
detecting an on-the-go (OTG) connection signal from the second external input power source, and
providing the charging voltage and the charging current to the battery and the second external input power source in response to the detected OTG connection signal.

14. The method of claim 11, wherein the second driving comprises driving the flash unit through a third current path among the plurality of different current paths by turning-on a system switch that receives the battery voltage and the battery current from a system node.

15. The method of claim 14, further comprising:
driving the flash unit through the second current path in response to detecting connection of the at least one external input power source to the integrated circuit during the third driving; and
driving the flash unit based on the third current path in response to receiving a second bypass voltage sensing signal that is logic high during the third driving.

16. The method of claim 10, further comprising:
detecting a first buck signal during the first driving, the first buck signal indicating whether to step down a voltage level of the charging voltage received from the at least one external input power source to charge the battery;
fifth driving the flash unit based on the battery voltage and the battery current received from the battery when the first buck signal is logic low; and
sixth driving the flash unit based on the charging voltage and the charging current received from the at least one external input power source when the first buck signal is logic high.

17. The method of claim 16, further comprising:
driving the flash unit based on the battery voltage and the battery current received from the battery when a second buck signal that is logic low is detected during the sixth driving.

18. The method of claim 10, further comprising:
performing a high-voltage OTG operation when the at least one external input power source is not connected to the integrated circuit in response to detecting a second bypass voltage sensing signal that is logic high and an on-the-go (OTG) connection signal;
interrupting the high-voltage OTG operation in response to detecting a third bypass voltage sensing signal that is logic low during the performing the high-voltage OTG operation; and
performing a normal OTG operation in response to the interrupting.

19. An electronic device comprising:
a camera unit;
a flash unit configured to irradiate flash light to a subject;
a main power-management IC (PMIC) chip connected to a system node and configured to provide a supply voltage to one or more internal components of the electronic device; and
circuitry comprising a light-emitting device switch, a system switch and at least one switch configured to connect an external input power source and a battery to the system node the circuitry being configured to,
drive the flash unit based on a charging voltage received from the external input power source or a battery voltage received from the battery, and
charge the battery based on the charging voltage,
the light-emitting device switch being configured to control driving of the flash unit, the system switch being between the system node and the light-emitting device switch, the system switch being configured to apply the battery voltage received from the battery to the flash unit through the system node.

20. The electronic device of claim 19, wherein
the system switch comprises a body selection transistor, and
a body terminal of the body selection transistor is configured to connect to a node having a higher voltage level among a first node formed adjacent to a first source or drain terminal of the body selection transistor and a second node formed adjacent to a second source or drain terminal of the body selection transistor.

* * * * *